(12) United States Patent
Liao et al.

(10) Patent No.: US 10,976,647 B2
(45) Date of Patent: Apr. 13, 2021

(54) METHOD AND SYSTEM FOR MOTION CAMERA WITH EMBEDDED GIMBAL

(71) Applicant: SZ DJI TECHNOLOGY CO., LTD., Shenzhen (CN)

(72) Inventors: Ran Liao, Shenzhen (CN); Tianhang Ma, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/697,153

(22) Filed: Nov. 26, 2019

(65) Prior Publication Data
US 2020/0096844 A1 Mar. 26, 2020

Related U.S. Application Data

(63) Continuation of application No. PCT/CN2017/086135, filed on May 26, 2017.

(51) Int. Cl.
*G03B 17/56* (2021.01)
*G03B 17/12* (2021.01)
(Continued)

(52) U.S. Cl.
CPC .......... *G03B 17/561* (2013.01); *G03B 5/02* (2013.01); *G03B 15/006* (2013.01); *G03B 17/12* (2013.01); *G03B 2205/0046* (2013.01)

(58) Field of Classification Search
USPC ................................ 396/427, 428
See application file for complete search history.

(56) References Cited

U.S. PATENT DOCUMENTS 6,149,112 A * 11/2000 Thieltges ............ B60R 11/04
224/908
7,714,262 B2 * 5/2010 Olsen ............ H04N 5/23287
250/208.1
(Continued)

FOREIGN PATENT DOCUMENTS

CN 101382636 A 3/2009
CN 201403041 Y 2/2010
(Continued)

OTHER PUBLICATIONS

The World Intellectual Property Organization (WIPO) International Search Report and Written Opinion for PCT/CN2017/086135 dated Mar. 1, 2018 10 pages.
(Continued)

*Primary Examiner* — Clayton E. LaBalle
*Assistant Examiner* — Warren K Fenwick
(74) *Attorney, Agent, or Firm* — Anova Law Group, PLLC

(57) ABSTRACT

An imaging device includes a housing, a carrier arranged within the housing, an optical assembly supported by the carrier within the housing, and a plurality of non-optical components arranged within the housing. The carrier includes one or more frame components that are configured to rotate relative to the housing about one or more axes of rotation. The optical assembly includes one or more lenses and an image sensor. The optical assembly is movable relative to the housing via the carrier about the one or more axes of rotation. At least one of the non-optical components is (1) operably coupled to the optical assembly and (2) not supported by the carrier.

20 Claims, 11 Drawing Sheets

(51) Int. Cl.
*G03B 5/02* (2021.01)
*G03B 15/00* (2021.01)

(56) References Cited

U.S. PATENT DOCUMENTS

| | | | |
|---|---|---|---|
| 10,272,994 B2* | 4/2019 | Wang | B64C 27/54 |
| 10,793,267 B2* | 10/2020 | Lee | B64D 27/24 |
| 2004/0173726 A1 | 9/2004 | Mercadal et al. | |
| 2008/0030597 A1* | 2/2008 | Olsen | H01L 27/14634 |
| | | | 348/227.1 |
| 2010/0019120 A1 | 1/2010 | Burnham et al. | |
| 2013/0051778 A1 | 2/2013 | Dimotakis | |
| 2015/0053833 A1* | 2/2015 | St. Louis | F16M 11/2014 |
| | | | 248/278.1 |
| 2016/0016674 A1* | 1/2016 | Zhao | G03B 15/006 |
| | | | 244/118.1 |
| 2016/0291445 A1 | 10/2016 | Fisher, Sr. et al. | |
| 2016/0344906 A1 | 11/2016 | Hernandez | |
| 2019/0104239 A1* | 4/2019 | Aschwanden | H04N 5/23299 |

FOREIGN PATENT DOCUMENTS

| | | |
|---|---|---|
| CN | 104580880 A | 4/2015 |
| CN | 104903790 A | 9/2015 |
| CN | 204979266 U | 1/2016 |
| CN | 106428595 A | 2/2017 |
| CN | 106575073 A | 4/2017 |
| CN | 106662793 A | 5/2017 |
| JP | H07234447 A | 9/1995 |
| JP | 2008111945 A | 5/2008 |
| JP | 2008301025 A | 12/2008 |
| JP | 2016138929 A | 8/2016 |
| WO | 2004001941 A1 | 12/2003 |
| WO | 2008099642 A1 | 8/2008 |
| WO | 2017078254 A1 | 5/2017 |

OTHER PUBLICATIONS

The World Intellectual Property Organization (WIPO) International Search Report and Written Opinion for PCT/CN2017/086171 dated Feb. 24, 2018 8 pages.

* cited by examiner

METHOD AND SYSTEM FOR MOTION CAMERA WITH EMBEDDED GIMBAL

CROSS-REFERENCE TO RELATED APPLICATION

This application is a continuation of International Application No. PCT/CN2017/086135, filed on May 26, 2017, the entire content of which is incorporated herein by reference.

BACKGROUND

For many years, both amateur and professional photographers and videographers have struggled with blurred images due to instability of the camera mounting, motion by the user, motion and vibration transferred to the camera from a mobile transport, or some combination of these issues.

Currently, there exist several methods of image or camera stabilization. For example, images can be processed by software for stabilization. In another example, vibration of the camera may be mediated by individually stabilizing either a lens or a sensor, or stabilizing an overall imaging device as a whole. Such stabilization techniques are still unable to effectively eliminate vibrations or undesired movements having large amplitude and high frequency in a compact form.

SUMMARY

Thus, a need exists for improved systems and methods of image stabilization. A further need exists for optical stabilization that allows for a compact imaging device. Traditional methods of vibration dampening commonly employed in photography and videography to reduce the effects of vibration on the picture include software stabilization, lens-only stabilization, sensor-only stabilization, and overall imaging device stabilization, which do not provide effective stabilization techniques in compact form.

Lens stabilization and sensor stabilization are now widely applied in many consumer digital cameras. The general principle of lens stabilization is to eliminate the shake on the lens by controlling horizontal displacement or rotation of a certain lens or some lenses; and sensor stabilization is intended to offset the vibration by enabling a photosensitive sensor to translate or rotate. Lens stabilization and sensor stabilization are both implemented within the image capturing equipment, requiring minimal volume. However, due to structural limitations and limited travel range of the movement (including translation and rotation) of the lens or sensor, vibration with large amplitude or at high frequency is still difficult to eliminate completely, particularly when carrying the shooting equipment or mounting video equipment on a moving vehicle resulting in a large movement range.

The effectiveness of software stabilization is limited. An extremely large amount of computation is required in the shake elimination process for video, often resulting in only a limited beneficial effect.

Overall, methods applied to imaging device stabilization mainly perform stabilization for the overall imaging device on three rotation axes, with a large rotation range and reasonably quick response. This can substantially overcome the drawbacks in lens stabilization and sensor stabilization. However, as stabilization is performed for the entire set of (video) imaging device, the structure is usually quite large, making it inconvenient to carry or use, and requires a great amount of energy (batteries) to drive the stabilizing equipment, making it inconvenient, impractical and relatively expensive for most commercial and personal applications.

Therefore, a need exists for an imaging device capable of capturing stabilized image data with a compact size. Systems and methods are provided for performing effective stabilization for a wide variety of applications including but not limited to still photo and video imaging. An imaging device for capturing stabilized images is provided by performing active stabilization to the optical assembly of the imaging device from the non-optical unit of the imaging device. The present disclosure can substantially reduce the mass volume of the stabilized imaging device necessary to achieve such stabilization. This disclosed approach of stabilization i) reduces size and/or weight, ii) augments existing stabilization methods and/or, iii) facilitates miniaturization of the entire imaging device construct and any external stabilization structures used therewith. The device and system may be an imaging device with integrated carrier for supporting at least an optical assembly of the imaging device.

In one aspect, the present disclosure provides an imaging device. The imaging device may comprise: a housing; a carrier arranged within the housing, wherein the carrier comprises one or more frame components that are configured to rotate relative to the housing about one or more axes of rotation; an optical assembly supported by the carrier within the camera housing, wherein the optical assembly comprises one or more lenses and an image sensor, and wherein the optical assembly is movable relative to the housing via the carrier about the one or more axes of rotation; and a plurality of non-optical components arranged within the housing such that at least one non-optical component is (1) operably coupled to the optical assembly and (2) not supported by the carrier. The carrier may be controlled to stabilize the optical assembly based on sensory data. The carrier may be configured to control an orientation or attitude of the optical assembly.

In some embodiments, the optical assembly of the imaging device comprises one or more lenses and an image sensor. The one or more lenses are supported by a lens carrier. In some cases, the one or more lenses are partially enclosed in a lens carrier. Alternatively, the one or more lenses are fully enclosed within the lens barrel. The lens barrel may be operably coupled to at least one frame component of the carrier. In some embodiments, the image sensor is provided on a first circuit board (PCB) supported by a substrate holder. The lens barrel is operably coupled to the substrate holder, such that the one or more lenses in the lens barrel and the first circuit board are movable relative to each other. In some cases, the lens barrel is movable along an optical axis to adjust a distance of the one or more lenses from the image sensor. Alternatively, the first circuit board is movable along an optical axis to adjust a distance of the image sensor from the one or more lenses. In another alternative case, the first circuit board and the lens barrel are movable along an optical axis to adjust a distance of between the image sensor and the one or more lenses. In some cases, at least one of the lens barrel or the substrate holder is rigidly attached to a frame component of the carrier. In some cases, at least one of the lens barrel or the substrate holder is attached to and movable relative to a frame component of the carrier. In some cases, the substrate holder is integrally formed with the lens barrel. In some cases, is operably coupled to at least one frame component of the carrier.

In some embodiments, the plurality of non-optical components comprise a power source, a memory unit, and one or more processors mounted on a second printed circuit board (PCB). The plurality of non-optical components are attached to an inner surface of the housing. In some embodiments, the plurality of non-optical components are not supported by the carrier. In some embodiments, the image sensor is operably coupled to at least one of the non-optical components. In some embodiments, the first PCB is operably coupled to the second PCB via one or more communication links. In some cases, the one or more communication links comprise a flexible signal line, or alternatively, the one or more communication links comprise a wireless communication channel.

In some embodiments, the optical assembly of the imaging device is rotatable about one or more axes of rotation relative to one or more non-optical components within the camera housing. In some embodiments, the optical assembly is rotatable about at least one of the following axes: yaw axis and pitch axis. In some cases, the optical assembly is rotatable about at least two of the following axes: yaw axis, pitch axis, and roll axis. In some cases, two or more of the axes of rotation are orthogonal to one another. In some cases, two or more of the axes of rotation are non-orthogonal to one another.

In some embodiments, the carrier embedded in the imaging device is a multi-axis gimbal. In some embodiments, the carrier comprises a plurality of frame components operably coupled to a plurality of motors, and wherein the plurality of motors are configured to actuate the plurality of frame components to rotate about two or more axes of rotation. In some cases, the axes of rotation comprise at least one of the following axes: yaw axis and pitch axis. In some cases, the optical assembly is supported by a frame component that is not directly and/or rigidly coupled to a portion of the housing. In some embodiments, the carrier comprises a spherical motor arranged within the camera housing. In some cases, the spherical motor is configured to rotate the optical assembly about one or more axes of rotation. In some cases, the spherical motor comprises a spherical stator and a spherical rotor, and wherein the spherical rotor is movable relative to the spherical stator. The spherical rotor is driven by electromagnetic forces or friction forces. The optical assembly is coupled to the spherical rotor. In some embodiments, the spherical motor comprises a spherical stator and a plurality of piezoelectric actuators, and wherein the motor is driven by frictional driving forces.

In some embodiments, the housing of the imaging device comprises a transparent cover permitting the optical assembly to have lines-of-sight in different directions to an environment external to the housing. In some cases, the optical assembly is capable of capturing images from the different directions when the optical assembly is rotated via the carrier relative to the housing. The different directions may be defined relative to different sides of the housing, and wherein two or more of the sides of the housing are opposite to each other. In some cases, the transparent cover forms a portion of the housing. In some cases, the transparent cover is removable from the housing.

In some embodiments, the housing is configured to be coupled to a base support. The base support is located on or carried by at least one selected from the following: a movable object, a stationary object, or a living subject. The movable object comprises an aerial vehicle, a land-based vehicle, or a handheld mount. In some embodiments, the housing is rigidly coupled to the base support.

In some embodiments, the housing is rotatably coupled to a base support via at least one motor. In some cases, the housing is attached to a rotor of the motor, and wherein a stator of the motor is attached to the base support. In some cases, the housing is attached to a stator of the motor, and wherein a rotor of the motor is attached to the base support. In some cases, the motor is configured to rotate the housing about an axis of rotation relative to the base support. In some case, the axis of rotation of the housing may be a yaw axis. In some cases, the axis of rotation of the housing may be parallel to at least one axis of rotation of the carrier. In some cases, the axis of rotation of the housing is oblique to at least one axis of rotation of the carrier. In some cases, the axis of rotation of the housing is orthogonal to at least one axis of rotation of the carrier. In some cases, the axis of rotation of the housing intersects with at least one axis of rotation of the carrier. In some embodiments, the motor is configured to rotate the stator relative to the base support about a yaw axis, and wherein the carrier is configured to rotate the optical assembly relative to the housing about at least one of a pitch axis or roll axis.

In some embodiments, a rotational movement of the carrier is measured using one or more sensors. In some cases, the imaging device comprises at least one inertial sensor attached to the carrier or the optical assembly. In some cases, the inertial sensor comprises at least one of a gyroscope or an accelerometer and the inertial sensor is configured to detect at least one of a position, attitude, angular velocity, or angular acceleration of the optical assembly. In some cases, the one or more sensors comprise a magnetic field sensor or an optical encoder configured to detect a rotational position of one or more actuators for driving the rotational movement of the carrier.

In some embodiments, a method of controlling the imaging device is provided. In practice, the method may comprise: assessing a positional state of the optical assembly and/or the housing using one or more motion sensors and/or positional sensors; and controlling, based on the assessed positional state, one or more actuators to effect movement of the optical assembly relative to the housing via the carrier, wherein said movement of the optical assembly is effected by rotating the one or more frame components about the one or more axes of rotation.

In some embodiments, the one or more actuators are configured to effect movement of the optical assembly relative to the housing based on a target angle. In some cases, one or more processors are individually or collectively configured to determine, based on the target angle, an input torque to be provided from the one or more actuators to the one or more frame components of the carrier. In examples, the input torque is determined using a feedback control loop. The feedback control loop is implemented using a proportional-integral-derivative (PID) controller comprising the one or more processors. The PID controller may be located within the housing. The PID controller is configured to determine an input angular velocity based on a difference between the target angle and an angle measured by the one or more motion and/or positional sensors. The PID controller is configured to determine the input torque based on a difference between the input angular velocity and an angular velocity measured by the one or more motion and/or positional sensors.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

Figure 1:
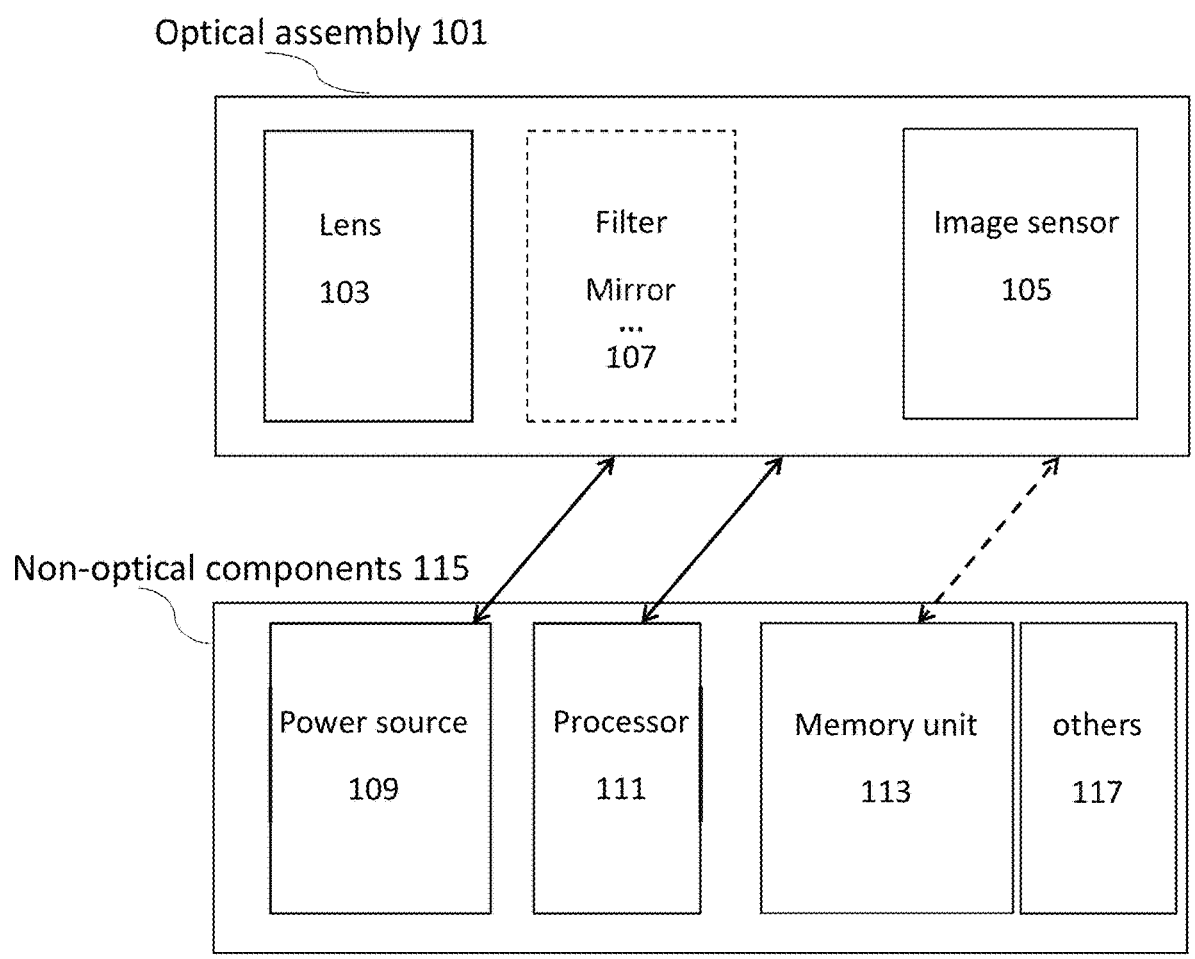
FIG. 1 shows examples of optical assembly and examples of non-optical components of an imaging device.

Devices, systems and methods are provided for capturing images by providing active stabilization to the optical assembly of the imaging device from the non-optical unit of the imaging device. The device and system may be an imaging device with integrated carrier to support at least an optical assembly of the imaging device. The carrier may be embedded in the imaging device. In some cases, a plurality of non-optical components are enclosed in the housing of the imaging device while not be supported by the carrier. The present method can substantially reduce the mass volume of the stabilized imaging device necessary to achieve such stabilization. This approach of stabilization i) reduces size and/or weight of the payload to be stabilized by a carrier, ii) augments existing stabilization methods, and/or iii) facilitates miniaturization of the entire imaging device construct and any external stabilization structures used therewith. Since a smaller portion (e.g., the optical assembly) is stabilized by the carrier, the carrier may be smaller than a carrier stabilizing an entire imaging device. The subject apparatuses and methods described herein provide compact and reliable imaging device with integrated stabilization systems that can be used for different environmental and motion conditions, and can stabilize images in real-time as the images are being captured. Because the payload to be stabilized by the carrier is an optical assembly instead of the entire imaging device, the amount of energy required by the carrier for performing stabilization is less than that required to drive a frame assembly supporting the entire imaging device. For instance, the amount of energy required to stabilize the optical assembly without stabilizing one or more non-optical components (e.g., battery, memory unit, processor, housing of the imaging device) required for the operation of the imaging device is less than the amount of energy required to stabilize the entire imaging device including the one or more non-optical units required for operation of the imaging device.

In one aspect, an imaging device is provided. The imaging device may comprise: a housing; a carrier arranged within the housing, wherein the carrier comprises one or more frame components that are configured to rotate relative to the housing about one or more axes of rotation; an optical assembly supported by the carrier within the camera housing, wherein the optical assembly comprises one or more lenses and an image sensor, and wherein the optical assembly is movable relative to the housing via the carrier about the one or more axes of rotation; and a plurality of non-optical components arranged within the housing such that at least one non-optical component is (1) operably coupled to the optical assembly and (2) not supported by the carrier. The carrier may be controlled to stabilize the optical assembly based on sensory data. The carrier may be configured to control an orientation or attitude of the optical assembly. In some cases, the carrier may comprise one or more frame components movable relative to one another such that the movement of the optical assembly may be controlled about one or more rotational axes.

The imaging device can be a standalone imaging device or can be coupled to any other objects or systems. The imaging device can be, for example an action camera. For example, the action camera can be used for capturing still image or film videos while being immersed in the action. An action camera may capture images while being in motion. The camera can be used in various environmental conditions such as outdoor sports, extreme sports such as base jumping, or under water. For example, the camera can be attached to a helmet, surfboard, handlebar, or wrist of a rider involved in a sport or activity. The imaging device may be an imaging device that can be carried by a living subject or supported by a stationary or movable object. For instance, the imaging device may comprise a housing that can be held or worn by a human or any other live being, or attached to any suitable object. The imaging device may be part of another device. The imaging device may be operably coupled to another device. For instance, the imaging device may be coupled to another device, such as a mobile phone, a tablet, a laptop, a wearable device, a digital camera, or any other devices that use a camera. For example, the imaging device may be embedded in the other device. The imaging device may be integral to the other device. The imaging device may be removably attached to the other device. In another instance, the imaging device may be a payload carried by a movable object. In an additional instance, the imaging device may be a functional sensor of a movable object such as a vision sensor for providing location or positional information.

The imaging device can be used for capturing image data. In some embodiments, the imaging device may be a camera. A camera can be a movie or video camera that captures dynamic image data (e.g., video). A camera can be a still camera that captures static images (e.g., photographs). A camera may capture both dynamic image data and static images. A camera may switch between capturing dynamic image data and static images. Although certain embodiments provided herein are described in the context of cameras, it shall be understood that the present disclosure can be applied to any suitable imaging device, and any description herein relating to cameras can also be applied to any suitable imaging device, and any description herein relating to cameras can also be applied to other types of imaging devices. A camera can be used to generate 2D images of a 3D scene (e.g., an environment and one or more objects). The images generated by the camera can represent the projection of the 3D scene onto a 2D image plane. Accordingly, each point in the 2D image corresponds to a 3D spatial coordinate in the scene. The camera may capture color images, greyscale image, and the like. The imaging device may be an optical imaging device, an infrared imaging device, an ultraviolet imaging device, or a thermal imaging device. The imaging device may be able to image an environment by detecting various wavelengths of along an electromagnetic spectrum (e.g., visible light, infrared, ultraviolet, etc.) in the environment.

The imaging device may comprise an optical assembly and one or more non-optical components. FIG. 1 shows examples of optical assembly 101 of an imaging device. The optical assembly may comprise at least one or more lenses 103 and/or one or more image sensors 105. In some cases, the optical assembly may further comprise additional components that may affect the image data captured by the image sensor(s), such as filters and mirrors.

The image sensors 105 may be configured to generate image data in response to wavelengths of light. A variety of image sensors may be employed for capturing image data such as complementary metal oxide semiconductor (COMS) or charge-coupled device (CCD). In some cases, the image sensor may be provided on a circuit board. The circuit board may be an imaging printed circuit board (PCB). The circuit board may comprise a plurality of electronic elements for processing the image signal. For instance, the circuit for a CCD sensor may comprise A/D converters and amplifiers to amplify and convert the analog signal provided by the CCD sensor. Optionally, the image sensor may be integrated with amplifiers and converters to convert analog signal to digital signal such that a circuit board may not be required. In some cases, the output of the image sensor or the circuit board may be image data (digital signals) can be further processed by a camera circuit or processors of the camera. In some cases, the image sensor may comprise an array of optical sensors.

The imaging sensor may capture an image frame or a sequence of image frames at a specific image resolution. The image frame resolution may be defined by the number of pixels in a frame. The image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. The imaging device may have pixel size no more than 1 micron, 2 microns, 3 microns, 5 microns, 10 microns, 20 microns and the like. The camera may be, for example, a 4K camera or a camera with a higher resolution. Pixels of camera may be square. Alternatively, pixels may be non-square. The imaging device may capture color images, greyscale image, and the like.

The imaging sensor may capture a sequence of image frames at a specific capture rate. In some embodiments, the sequence of images may be captured at standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.01 seconds, 0.02 seconds, 0.05 seconds. 0.1 seconds, 0.2 seconds, 0.5 seconds, 1 second, 2 seconds, 5 seconds, or 10 seconds. In some embodiments, the capture rate may change depending on user input and/or external conditions (e.g. illumination brightness).

The one or more lenses 103 may include various types of lenses such as front lens, condenser lens, fisheye lenses, apochromatic lenses, process lenses, stereoscopic lenses, soft-focus lenses, infrared lenses, ultraviolet lenses, and/or swivel lenses. The one or more lenses may have optical characteristics of different ranges. The focal length or the aperture of the lenses may have various values. The one or more lenses may interact with light in any manner. For example, the one or more lenses may focus, disperse, and/or collimate light. The lens may have an optical axis passing through the lens. The optical axis of the lens may be substantially perpendicular to a diameter of the lens. The one or more lenses may have any size. For example, the one or more lens may have a diameter of less than or equal to about 5 cm, 4 cm, 3 cm, 2.5 cm, 2 cm, 1.5 cm, 1.2 cm, 1 cm, 9 mm, 8 mm, 7 mm, 6 mm, 5 mm, 4 mm, 3 mm, 2 mm, 1.5 mm, 1 mm, 0.5 mm, 0.3 mm, 0.1 mm, 0.05 mm, or 0.01 mm. The one or more lenses may have a weight of less than or equal to 10 g, 7 g, 5 g, 4 g, 3 g, 2.5 g, 2 g, 1.5 g, 1.2 g, 1 g, 750 mg, 500 mg, 300 mg, 200 mg, 100 mg, 75 mg, 50 mg, 25 mg, 10 mg, 7 mg, 5 mg, 3 mg, 2 mg, or 1 mg.

The one or more lenses, in some cases, together with other optical components 107 may be used for different purposes to achieve various optical effects. Other optical components may include any type of optical elements. For instance, an example of an optical element may include an optical filter that may be used to selectively transmit or reject a wavelength or range of wavelengths. Examples of filters may include a bandpass interference filter that may transmit a portion of an electromagnetic spectrum, while rejecting all other wavelengths. One or more notch filters may be provided as an example of an optical filter. A notch filter may reject a portion of the spectrum, while transmitting all other wavelengths. Edge or dichroic filters may transmit wavelengths that are either greater than the cut-on or shorter than the cut-off wavelengths. Another example of a filter may include a color substrate filter, which may utilize the filter material's inherent adsorption and transmission properties. A neutral density (ND) filter may evenly reduce transmission across a portion of the spectrum. In some cases, UV/infrared cut filters may be used for blocking infrared light and some UV light while allows a full spectrum camera to take normal pictures. Examples of optical elements may include filters, mirrors, prisms, lenses, dichroic filters, beamsplitters, optical fibers, or any other types of optical elements. Optical elements may pass light therethrough, reflect light, disperse light, refract light, focus light, focus light, filter light, or perform any other actions on the light. Any optical elements or combinations of optical elements may be provided. The optical assembly may comprise any elements a motion of which may influence the raw image data captured by the image sensor. For example, a motion of the lens or image sensor (e.g., vibration, shaking) may cause blurriness in the captured image.

The optical assembly may further comprise components that are useful for adjusting the light path. In some embodiments, the optical assembly may include zoom lens for which the focal length or angle of view can be varied. The imaging device may provide optical zoom by adjusting focal length of the zoom lens. For instance, one or more lenses may slide along an optical axis to adjust a focal length such that a designed zoom level or magnification level can be achieved. The focal length may be increased when zooming out, and the focal length may be decreased when zooming in.

The focal length may be adjusted by moving the one or more lenses along the optical axis relative to an imaging sensor. The focal length may be adjusted by moving the imaging sensor along the optical axis relative to the one or more lenses. The focal length may be adjusted by moving both the imaging sensor and the one or more lenses such that a distance between imaging sensor and the lenses is adjusted. In some cases, one or more motors may be included for moving the one or more elements (e.g., lens, imaging sensor) to adjust the focal length. The imaging device may comprise one or more zooming motors that may adjust a relative distance between the imaging sensor and the one or more lenses, and/or adjust any other optical element that may affect the optical path of light captured by the imaging device to the imaging sensor. The one or more zooming motors may be supported by the carrier. For example, a zooming motor may be included to adjust a distance between the image sensor and one or more optical elements such as one or more lenses. The zooming motor may be configured to drive the image sensor to move relative to the one or more optical elements along an optical axis. Alternatively, the zooming motor may be configured to drive one or more lenses relative to the image sensor along the optical axis. The zooming motor may drive the one or more lenses and/or image sensor to move in any direction, such in a direction parallel to the optical axis. In some cases, the optical assembly may comprise some or all of the components that have an effect, such as distorting or directing, of the incident light.

The imaging device may further comprise one or more non-optical components 115. A non-optical assembly may be provided that may comprise one, two, or more non-optical components. The non-optical components may include any elements as part of an imaging device or any elements that may not be part of a conventional imaging device. The non-optical components may or may not be coupled to the optical assembly. Any suitable components may be enclosed in a housing of the imaging device such as a power source (e.g., battery 109), a memory unit (e.g., storage medium 113), circuitry, one or more processors 111 and/or other non-optical components 117.

One or more power sources 109 may be used to power one or more components of the imaging device. For example, one or more power sources may provide power to an image sensor, a carrier, or any of the non-optical components. A power source may be an energy storage device, such as one or more batteries. The batteries may be rechargeable batteries (i.e. secondary batteries). Batteries having any battery chemistry known or later developed in the art may be used. In some instances, batteries may be lead acid batteries, valve regulated lead acid batteries (e.g., gel batteries, absorbed glass mat batteries), nickel-cadmium (NiCd) batteries, nickel-zinc (NiZn) batteries, nickel metal hydride (NiMH) batteries, or lithium-ion (Li-ion) batteries. The power supplies may be used to power the carrier of the imaging device, such as a motor that actuates a frame component of the carrier. The power sources may power any other components of the imaging device, such as one or more sensors, communication unit, controller, memory, PCB board, and/or display/audio unit. The same power source may be used for multiple components, or different power sources may be used for different components. Batteries may also be exchanged or swapped out. A power source may be a non-optical component that is not supported by a carrier. Alternatively or in addition, a power source may be supported by a carrier.

The memory unit 113, such as an SD card, may be used to store collected image data. The memory unit may be used to store image data collected with aid of an image sensor. The memory unit may be in communication with the image sensor, which may provide data to be stored in the memory unit. The memory unit may comprise non-transitory computer readable medium. The non-transitory computer readable medium can store logic, code, and/or program instructions executable by one or more processors for performing one or more steps. The non-transitory computer readable medium can include one or more memory units (e.g., removable media or external storage such as an SD card or random access memory (RAM)). A memory storage unit may be a non-optical component that is not supported by a carrier. Alternatively or in addition, the memory storage unit may be supported by the carrier.

The one or more processors 111 may include any electronic device or set of electronic devices responsible for signal processing, manipulation of data, and/or communication to motors. In some embodiments, the one or more processors may process image data captured by the image sensor. The processor(s) can be a programmable processor (e.g., a central processing unit (CPU) or a microcontroller). In an example, the one or more processors may be configured to control a movement of the carrier or gimbal. For instance, control signals for controlling the carrier may be generated in a field programmable gate array (FPGA) and/or one or more Advanced RISC Machine processors (ARM). In another example, the one or more processors may be configured to process the image data such as one or more application-specific standard products (ASSP) or application-specific integrated circuits (ASIC). For instance, the one or more processors may be able to perform various digital image processing including Bayer transformation, demosaicing, noise reduction, image sharpening, re-sampling to assure the correctness of the image coordinate system, contrast enhancement, scale space representation, and the like. In a further example, the one or more processors may be in communication with one or more of the optical components such as the zooming motor to operate a zooming function. A processor may be a non-optical component that is not supported by a carrier. Alternatively or in addition, the processor may be supported by the carrier.

In some embodiments, one or more communication units may be provided as a non-optical component. The communication unit may provide one-way or two-way communication with the imaging device and the movable object or an external device. In some embodiments, the communication unit may wirelessly transmit. A communication unit may be a non-optical component that is not supported by a carrier. Alternatively or in addition, a communication unit may be supported by the carrier.

In some cases, some or all of the non-optical components are mounted on a printed circuit board (PCB). For example, the electronic elements of the non-optical components such as processors, memory unit, communication units, and the like may be mounted on the PCB board whereas the PCB board may be coupled to a power source attached to an inner surface of a housing of the imaging device. In another example, any of the above electronic components may be provided on a separate structure that may or may not be coupled to the PCB board. For instance, the memory unit may not be provided on the PCB board but connected to the processors attached to the PCB board via suitable communication links.

In some cases, the non-optical components may be operably coupled to the optical assembly. For instance, a battery is in electrical communication with the image sensor, the circuit board supporting the image sensor or the motor of the optical assembly. In another instance, image data captured by the image sensor may be transmitted to a medium storage or processed by processors within the housing. In some cases, the image sensor may be operably coupled to at least one of the non-optical components. For instance, the image sensor may be in communication with a processor, a memory unit, and/or a battery.

Suitable interconnect means (e.g., cable, wires, bus, wireless communication) may be employed to enable communication between the printed circuit board for the non-optical components and the circuit board supporting the imaging sensor, direct communication between one or more non-optical components and one or more optical components, or communication between the elements supported by a carrier and elements not supported by the carrier. In some cases, data transmission or electrical communication may be enabled in wired or wireless manner between the one or more non-optical components and optical assembly. One or more communication links may be used to allow for communication between the optical assembly and at least one of the non-optical components. The one or more communication links may comprise a flexible signal line. The one or more communication links may comprise a wireless communication channel (e.g. Bluetooth). In examples, a data transmission link and electricity communication link may be included to provide communication between the PCB board of the optical assembly and the PCB board of the non-optical components.

In some cases, the interconnect means or communication links may permit the connected components to have a relative movement with respect to each other. For example, an image sensor may be connected to a processor of the non-optical components via a flexible cable such that the image sensor may be permitted to rotate about one or more axes relative to the processor that it is connected to.

The imaging device may include any other non-optical components 117 for various purposes. For instance, the non-optical components may include an audio capture device (e.g., a parabolic microphone), radio-frequency (rf) sensors, magnetic sensors, and/or ultrasonic sensors. In another instance, the non-optical components may include one or more emitters for providing signals to one or more targets to be imaged. Any suitable emitter can be used, such as an illumination source or a sound source. The non-optical components may include one or more transceivers, such as for communication with a module remote from the imaging device. The non-optical components may include components a motion of which may not directly alter or affect a light path of the light captured by the image sensor. In some cases, the non-optical components may include a carrier comprising one or more sensors, frame assembly, and actuators. Alternatively, the carrier may not be considered as non-optical components of the imaging device. Details about the carrier are described later herein.

In some cases, the non-optical components may include a communication unit configured to provide communication between the imaging device and another remote device. In some instances, image data may be transmitted to an external device by the communication unit. For example, images may be output for display on an external device located remotely from the imaging device. The external device can be a display device such as, for example, a display panel, monitor, television, projector, or any other display device. In some embodiments, the output device can be, for example, a cell phone or smartphone, personal digital assistant (PDA), computer, laptop, desktop, a tablet PC, media content player, set-top box, television set including a broadcast tuner, video game station/system, or any electronic device capable of accessing a data network and/or receiving image data from the imaging device. The communications provided herein may be two-way communications. Alternatively, one-way communications may be provided (e.g., only from the imaging device to an external device, or from an external device to the imaging device).

Any of the communications provided herein may occur directly. Alternatively, they may occur over a network, such as a local area network (LAN) or wide area network (WAN) such as the Internet. Communication units may utilize LANs, WANs, infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications.

It should be noted that one or more of the non-optical components can also be supported by the carrier. For instance, the processor for processing the image data may be provided on the PCB board supported by the carrier.

In some cases, the one or more non-optical components and the optical assembly are enclosed in a housing of the imaging device. In some cases, the non-optical components and the optical assembly are contained in the same housing. In some cases, the non-optical components and the optical assembly are contained in separated compartments of the housing. The optical assembly may be supported by a carrier which is arranged within the housing. The carrier may comprise one or more frame components configured to rotate relative to the housing such that a motion of the optical assembly may be stabilized. The one, two or more non-optical may be arranged within the housing and at least one non-optical component is operably coupled to the optical assembly and not supported by the carrier. For example, a battery and/or camera processor of the imaging device may be operably coupled to the optical assembly while not supported by the carrier.

Figure 2:
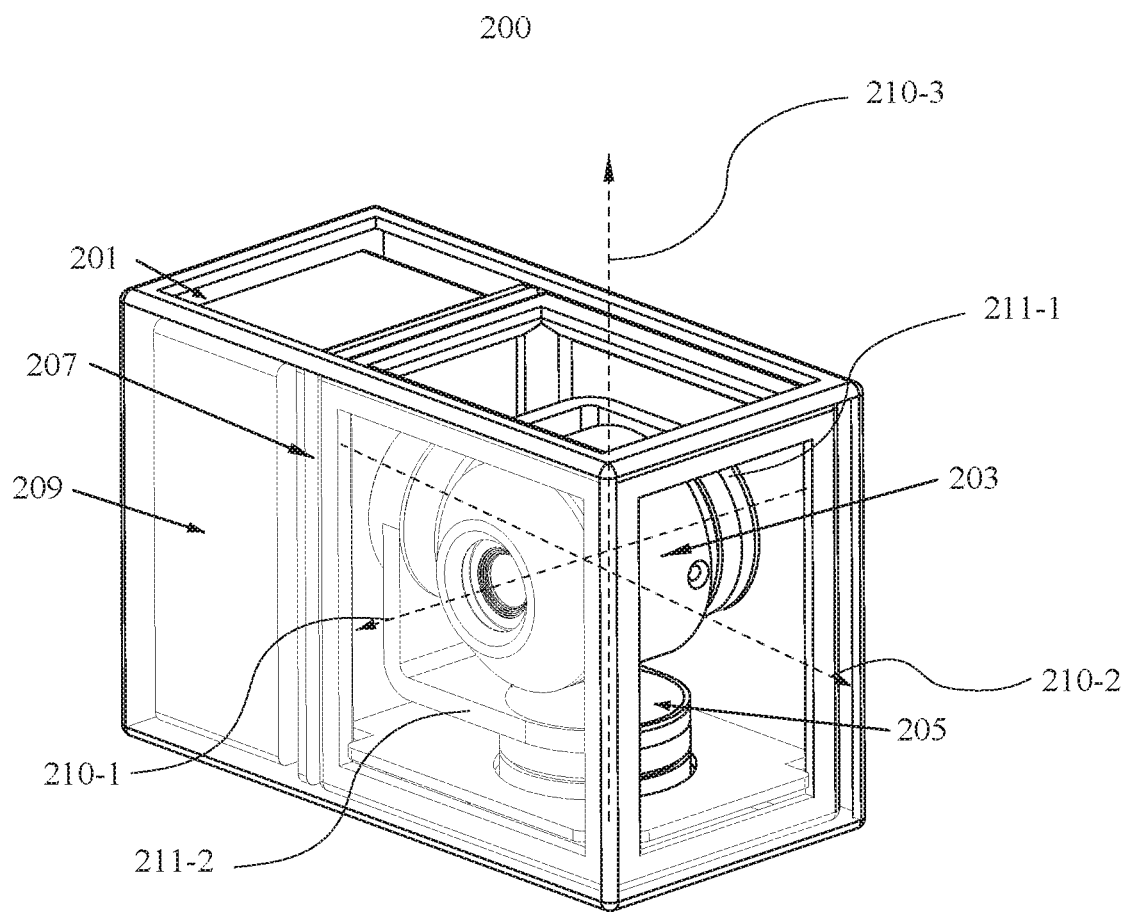
FIG. 2 illustrates an exemplary imaging device.

FIG. 2 illustrates an example of an imaging device 200. The imaging device may comprise a housing 201. The housing may enclose (partially or completely) an optical assembly 203 and a plurality of non-optical components such as one or more batteries 209, one or more processors 207. The imaging device may comprise a carrier 205 arranged within the housing and configured to control a movement of the optical assembly. Controlling movement may comprise stabilization and/or vibration reduction. Control of movement may include passive control to respond to movements of the imaging device relative to a reference frame. Passive control may cause the imaging device to maintain a set orientation with respect to a reference frame, such as an inertial reference frame. Control of movement may also include active control to respond to instructions to adjust an orientation of the imaging device. The set orientation for the imaging device may be adjusted during active control. The instructions may be provided by a remote controller or other device remote to the imaging device. The instructions may be provided by a movable object supporting the imaging device.

In some embodiments, the plurality of non-optical components may comprise a power source, a memory unit, and/or one or more processors. The plurality of non-optical components may comprise any additional elements as described previously herein. In some cases, all or some of the non-optical components may be mounted on a printed circuit board (PCB). In some cases, at least one of the non-optical components and/or the circuit board may be attached to an inner surface of the housing. One or more non-optical components may be stationary relative to the housing. A PCB may or may not be stationary relative to the housing. In some embodiments, the one or more non-optical components and the circuit board may not move relative to the housing of the imaging device.

In some embodiments, at least one of the non-optical components is not supported by the carrier. In some cases, all of the non-optical components are not supported by the carrier. In some cases, some of the non-optical components are supported by the carrier such that they may have a relative movement with respect to the housing whereas other components are rigidly attached to the housing. In some cases, at least a power source and the PCB board are attached to the housing while not supported by the carrier. In some cases, at least a power source and one or more processors are attached to the housing while not supported by the carrier. In some cases, at least a power source, a memory unit and one or more processors are attached to the housing while not supported by the carrier.

The optical assembly 203 may be the same optical assembly as described previously in FIG. 1. The optical assembly may, for example, comprise at least one or more lenses and one or more image sensors. In some cases, the image sensor may be provided on a circuit board. The circuit board may be supported by a substrate holder. The circuit board may be fixed relative to the substrate holder. The circuit board may comprise a plurality of electronic elements configured to process the signals captured by the image sensor. In some cases, an output data (image data) of the circuit board may be transmitted to at least one of the non-optical component such as the processor for further data processing.

In some cases, the optical assembly may further comprise other components such as filters, iris diaphragms, condensers and the like which influences light or photons captured by the image sensor. The optical assembly may also comprise elements associated with various optical functions such as zooming. For example, the optical assembly may comprise one or more motors for adjusting a distance between the one or more lenses, optical components and the image sensor along an optical axis (primary axis).

The optical axis of an imaging device, which may also be referred to as the "principal axis," can be a line along which there is some degree of rotational symmetry in the imaging device. In some embodiments, the optical axis of the imaging device passes through the center of the optical components (e.g., lens, photo sensor) of the imaging device and/or coincides with the axis of rotational symmetry. In some cases, a lines-of-sight of the optical assembly may be aligned with the optical axis. The optical axis may be substantially perpendicular to a surface of an image sensor. A field of view may encompass the optical axis.

The optical assembly may be permitted to move relative to the housing. The optical assembly may be permitted to have a rotational movement about one, two or three axes with respect to the housing. In some cases, the rotational movement about the one or more axes may be in a range up to 90, 180, 270, 360 degrees respectively. In some cases, the optical assembly may be permitted to have a rotary movement which exceeds 360 degrees. Accordingly, a direction of lines-of-sight of the optical assembly may also in a wide range with respect to the housing.

The housing 201 of the imaging device may comprise any three dimensional shape such as spherical, cubic, pyramid, prism (e.g., rectangular prism), cone, cylindrical, and multi-facets shapes. In some cases, the housing may comprise a transparent cover permitting the optical assembly to have lines-of-sight in different directions to an environment external to the housing. The transparent cover may or may not be removable. In some cases, at least a portion of the housing is transparent such that the lines-of-sight of the optical assembly may not be obstructed by the housing while the optical assembly rotates relative to the housing. In some cases, one or more sides of the housing may be transparent. In some cases, a portion of a side of the housing is transparent. In some embodiments, at least 10%, 20%, 30%, 40%, 50%, 60%, 70%, 80%, 90%, or 100% of a total surface of the housing is transparent. In some cases, other structures that may be in the direction of the lines-of-sight may also be made of transparent material. The housing may be completely transparent so that images captured using optical components within the housing are not distorted or affected by the housing. The housing may include anti-glare or anti-reflective coatings. The housing may or may not comprise a material that may filter out undesired wavelengths of light. The housing may or may not function as a secondary lens. The housing may or may not affect a field of view of the imaging device. In some embodiments, a sufficient portion of the housing may be transparent to allow for panoramic images to captured using the imaging device. The optical components may be capable of rotating at least 360 degrees without obstruction, or any other angular measurement as described elsewhere herein. In some embodiments, one or more portions of the housing may be opaque. For example, one or more edges, corners, and/or sides may be opaque.

The housing of the imaging device may permit the device to be used in various environment and conditions. The housing may be made of materials that provide a variety of properties, such as waterproof, heatproof, dustproof or rugged surface. The housing may be fluid-tight (e.g., airtight, water-tight). The housing may be shatter proof or shatter resistant. The housing may provide a continuous closed outer surface for the imaging device. In some instances, the housing may have openings. The housing may or may not comprise openings to be coupled an external object such as a base support. In an example, the housing may have an opening such as a hole sized and shaped to accommodate a dimension of a motor for rotating the housing. In another example, the housing may comprise a structure such as a concave shape to be fixed to an exterior surface of the motor.

The housing may remain in a single configuration or may be transformable between two or more configurations. For example, the housing may or may not be openable to allow access to components within the housing. For instance, a portion of the housing may be opened or closed to transform the housing between an open configuration and a closed configuration respectively.

In one aspect, an imaging device with a built-in carrier is provided. In some embodiments, the carrier may be completely contained within the housing of the imaging device. The carrier may be supported by an inner surface of the housing of the imaging device. Alternatively, the carrier may be supported by a substrate external to the housing of the imaging device. In such embodiments, the housing may comprise an opening that may allow at least a portion of the carrier to pass through the housing. One or more portions of the carrier may move with respect to the substrate external to the housing. The housing may or may not be fixed relative to the substrate external to the housing.

The imaging device may have any suitable size and/or dimensions. The imaging device may be of a size and/or dimensions suitable for being lifted, carried or worn by a human. In some instances, the imaging device may have a maximum dimension (e.g., length, width, height, diameter, diagonal) of less than or equal to about: 0.5 cm, 1 cm, 2 cm, 3 cm, 4 cm, 5 cm, 10 cm, or 20 cm. The imaging device may have a footprint (which may refer to the lateral cross-sectional area encompassed by the imaging device) less than or equal to about: 1,000 $cm^2$, 500 $cm^2$, 100 $cm^2$, 50 $cm^2$, 10 $cm^2$, 5 $cm^2$, 2 $cm^2$, 1 $cm^2$, or 0.01 $cm^2$. In some instances, the imaging device may weigh no more than 5 kg, 4 kg, 3 kg, 2 kg, 1 kg, 0.5 kg, 0.1 kg, 0.05 kg, 0.01 kg, 5 g, or 1 g. The imaging device may occupy a total volume of space of about equal to or less than 1000 $cm^3$, 750 $cm^3$, 500 $cm^3$, 400 $cm^3$, 300 $cm^3$, 250 $cm^3$, 200 $cm^3$, 175 $cm^3$, 150 $cm^3$, 125 $cm^3$, 100 $cm^3$, 75 $cm^3$, 50 $cm^3$, 40 $cm^3$, 30 $cm^3$, 20 $cm^3$, 15 $cm^3$, 10 $cm^3$, 5 $cm^3$, or 1 $cm^3$.

In the exemplary embodiment illustrated in FIG. 2, a front side, top side and left side of the housing may be transparent such that the optical assembly is permitted to capture image data of various view angles when the lines-of-sight is in a variety of directions. In some cases, the different directions may be defined relative to different sides of the housing. For instance, the optical assembly may be permitted to capture image data from different sides of the housing such as an opposing sides or adjacent sides.

Figure 3:
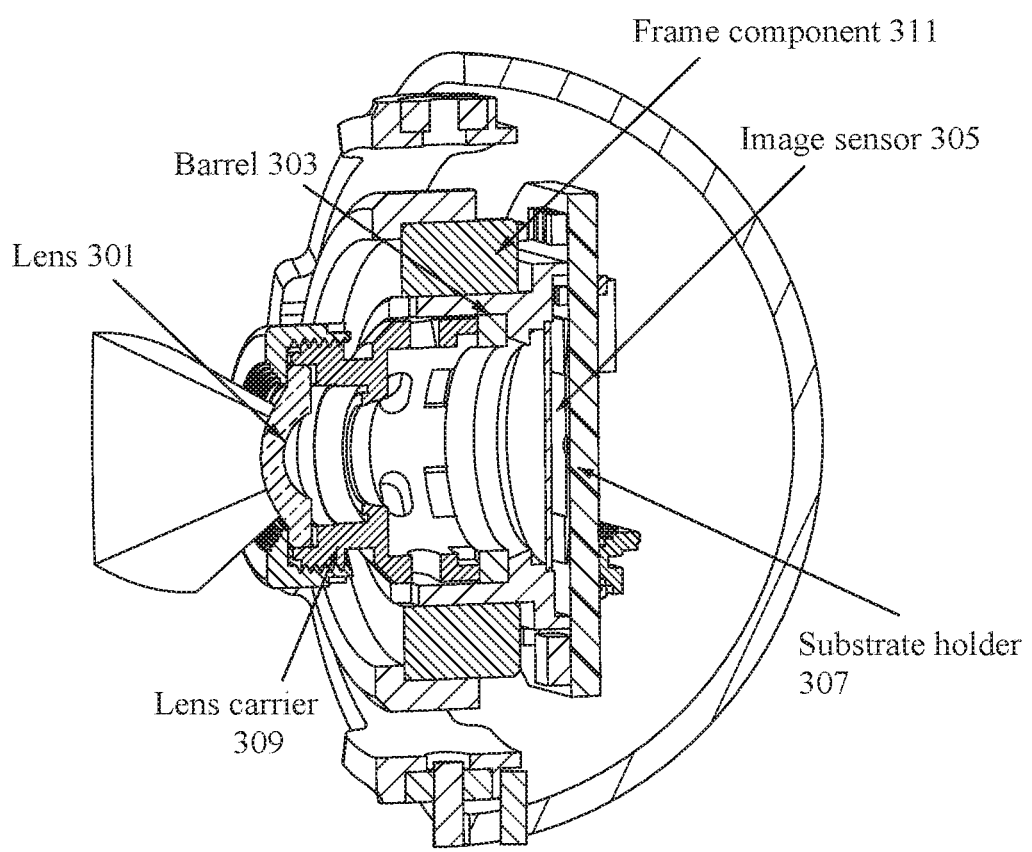
FIG. 3 shows an example of an optical assembly supported by a lens barrel.

In some embodiments, the one or more lenses may be supported by a lens barrel. In some cases, the one or more lenses may be partially enclosed in the lens barrel. For instance, one or more of the lenses may be supported by a holder coupled to the lens barrel. In other cases, circumferences of the one or more lenses may be fully enclosed within the lens barrel. In some embodiments, entire circumferences, or portions of the circumferences of the one or more lenses may be enclosed. FIG. 3 shows an exemplary optical assembly supported by a lens barrel 303.

In some embodiments, the lens barrel 303 may be coupled to at least one frame component 311 of the carrier. The lens barrel may be rigidly attached to the frame component of the carrier. The lens barrel may be directly coupled to the frame component. The lens barrel may be coupled to the frame component via additional connecting elements. The lens barrel may be releasably coupled to the frame component. The lens barrel may be integrally formed with the frame component. The lens barrel may not move relative to the frame component it is coupled to. Alternatively, the lens barrel may move relative to the frame component. In some exemplary embodiments, the frame component may be the innermost gimbal frame of a multi-axis gimbal. In some cases, when the lens barrel is attached to the gimbal frame, the movement of the lens barrel may be stabilized with respect to one, two, three or more rotational axes. The movement of the lens barrel may be passively or actively controlled.

In some embodiments, the image sensor 305 may be provided on a circuit board, both of which are supported by the lens barrel. Alternatively, the image sensor may not be provided on an external circuit board. The circuit board or the image sensor may be supported by a substrate holder 307. The substrate holder may be coupled to the lens barrel. In some cases, the substrate holder may be fixed to the lens barrel. The substrate holder may be integrally formed with the lens barrel. The substrate holder may or may not be rigidly attached to a frame component of the carrier. The substrate holder may be operably coupled to at least one frame component of the carrier.

In some cases, the substrate holder and/or the lens barrel may be configured to move relative to one another along the optical axis such that a distance of the one or more lenses from the image sensor may be adjusted. The distance changing between the one or more lenses and the image sensor may be controlled to achieve optical functions such as zooming. The change in distance may or may not affect focal length. In some cases, the image sensor or circuit board may be movable along the optical axis to adjust a distance of the image sensor from the one or more lenses. In some cases, the image sensor/circuit board and the lens barrel are both movable along the optical axis to adjust a distance of between the image sensor and the one or more lenses. One or more motors may be used for actuating the movement of the lens barrel and/or the substrate holder.

In some cases, the lens barrel may be rigidly attached to a frame component of the carrier and the substrate holder is movable relative to the frame component. In some cases, the substrate holder is rigidly attached to a frame component of the carrier and the lens barrel is movable relative to the frame component. In some cases, both of the lens barrel and the substrate holder may be rigidly attached to the frame component of the carrier. Optionally, both the lens barrel and the substrate holder may be movable relative to the frame component.

In the depicted embodiment, the one or more lenses may be supported on a lens carrier 309. The lens carrier 309 may be coupled to the lens barrel. In some cases, the lens carrier may be configured to move along the optical axis relative to the imaging sensor to adjust a distance between the one or more lenses and the imaging sensor. In some cases, the lens carrier may be configured to move along the optical axis relative to the lens barrel such as during zoom of the lens.

The carrier configured for supporting the optical assembly may consume a minimum amount of energy that is less than that required to drive a carrier supporting the entire imaging device. In some instances, actuators for stabilizing or controlling an orientation of the optical assembly will consume a fraction (e.g., 5%, 10%, 20%, 30%, 40%, 50%, 60%) of the amount of energy than that of the actuators required to drive a carrier supporting the entire imaging device. The optical assembly supported by the carrier may weigh no more than 50 g, 100 g, 200 g, 300 g, 400 g, 500 g, or 1000 g.

In some instances, a light weight of the payload supported by the carrier may provide a system with a quick response. The quick response may be due to the reduced momentum of the payload to be controlled thus an improved control response may be achieved. In some instances, the light weight of the payload may require less torque applied to the carrier leading to a reduced energy consumption.

The optical assembly that is supported by the carrier may be able to rotate about one or more axes of rotation relative to one or more non-optical components within the camera housing. The optical assembly may be rotatable about at least one of the following axes: yaw axis and pitch axis relative to the non-optical components or the housing. The optical assembly may be rotatable about at least two of the following axes: yaw axis, pitch axis, and roll axis relative to the non-optical components or the housing. The two or more of the axes of rotation may be orthogonal to one another (e.g., roll axis, pitch axis, yaw axis). The two or more of the axes of rotation may be non-orthogonal to one another (e.g., movement around a spherical surface). The optical assembly may be stabilized relative to a fixed reference frame such as a ground reference frame. For instance, an attitude of the optical assembly may be stabilized at a desired orientation relative to a fixed reference frame. The optical assembly can be configured to move relative to the housing or a movable object the housing is coupled to (e.g., with respect to one, two, or three degrees of translation and/or one, two, or three degrees of rotation) such that the optical assembly maintains its position and/or orientation relative to a suitable reference frame regardless of the movement of the movable object. The reference frame can be a fixed reference frame (e.g., the surrounding environment). Alternatively, the reference frame can be a moving reference frame (e.g., the movable object, a payload target). For instance, the moving reference frame may be used to specify a movement relative to the payload target for autonomous tracking.

In some cases, the optical assembly may be stabilized by compensating for unwanted vibration movement of the optical assembly. The optical assembly may only be stabilized in response to an unwanted movement (e.g., vibrations and shaking), and may not be stabilized in response to a deliberate movement (e.g., a walking motion). For example, a low pass filter may be used to smooth out low-frequency motion such as those induced by walking, so that the attitude of the optical assembly may only be stabilized in response to the high-frequency motion such as shaking.

In some cases, an orientation of the optical assembly may be controlled. In some instances, an orientation of the optical assembly may be defined with respect to the environment (e.g., the ground). For example, the optical assembly may be leveled with respect to a ground surface. In some instances, a user may be allowed to steer an orientation of the optical assembly by sending command to the controller of the carrier. In some instances, an orientation of the optical assembly may be controlled in response to a desired orientation. A controller may generate a signal to maintain the optical assembly in a desired orientation in presence of a steering signal. The desired orientation may be preselected from a plurality of options. For example, the desired orientation may be selected between a horizontal orientation and a vertical orientation. For example, the desired orientation may be selected between a degree of angle that the imaging device rotates about a roll, pitch, or yaw axis, e.g., 0 degrees, 30 degrees, 45 degrees, 60 degrees, 90 degrees, 120 degrees, 150 degrees, or 180 degrees. In some instances, the desired orientation may be selected along a continuous spectrum (e.g., angles that the imaging device may be rotated about a roll, pitch, or yaw axis). In some instances, a user may input a specific desired orientation (e.g., numerical value of degree of rotation of the payload about a roll axis). In some instances, a user may select a specific desired orientation from a list. In some instances, an option to incrementally change an orientation (e.g., by 15 degrees) may be presented to the user via a user interface. For example, the user may desire to capture an image with a horizontal orientation, a vertical orientation, or an image having an arbitrary orientation (e.g., diagonal orientation). An image having a horizontal orientation may correspond to a landscape image. An image having a vertical orientation may correspond to a portrait image. An imaging sensor may capture an image having a horizontal orientation in a default position (e.g., upright or resting position). For example, in some cases, when the imaging device is coupled to a connector at a default state, the imaging device may capture an image having a horizontal orientation. The imaging device may capture an image having a vertical orientation if rotated 90 degrees about the roll axis.

In some embodiments, the carrier is arranged within the housing and configured to stabilize a movement of the optical assembly. The carrier may be a multi-axis gimbal such as the carrier 205 illustrated in FIG. 2. The carrier may comprise one or more frame components operably coupled to one or more actuators. The one or more actuators may be configured to actuate the one or more frame components to rotate about two or more axes of rotation. The axes of rotation may comprise at least one of the following axes: yaw axis and pitch axis. In some embodiments, the optical assembly is supported by a frame component that is not directly and/or rigidly coupled to a portion of the housing.

The one or more actuators are configured to effect movement of the optical assembly relative to the housing. The one or more actuators may be controlled to move the one or more frame components based on a target angle and the current positional state of the optical assembly. The one or more actuators may be controlled to move the one or more frame components based on a rotational movement of the carrier. In some cases, the rotation movement of the carrier may be measured using one or more sensors.

In some cases, the one or more sensors may be configured to detect or obtain motion and position information associated with the optical assembly. The motion and position information may include velocity, orientation, attitude, acceleration, position, and/or any other physical state experienced by the optical assembly.

The one or more sensors for detecting a position or motion state of the optical assembly may include at least an inertial measurement member. The inertial measurement member (inertial sensor) may comprise one or more gyroscopes, velocity sensors, accelerometers, magnetometers, and one or more location sensors. The inertial sensor may be used for obtaining data indicative of a spatial disposition (e.g., position, orientation, or angle) and/or motion characteristic (e.g., translational (linear) velocity, angular velocity, translational (linear) acceleration, angular acceleration) of a payload. An inertial sensor may be used herein to refer to a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. An inertial sensor may provide sensing data relative to a single axis of motion. The axis of motion may correspond to an axis of the inertial sensor (e.g., a longitudinal axis). A plurality of inertial sensors can be used, with each inertial sensor providing measurements along a different axis of motion. For example, three angular accelerometers can be used to provide angular acceleration data along three different axes of motion. The three directions of motion may be orthogonal axes. One or more of the angular accelerometers may be configured to measure acceleration around a rotational axis. As another example, three gyroscopes can be used to provide orientation data about three different axes of rotation. The three axes of rotation may be orthogonal axes (e.g., roll axis, pitch axis, yaw axis). Alternatively, at least some or all of the inertial sensors may provide measurement relative to the same axes of motion. Such redundancy may be implemented, for instance, to improve measurement accuracy. Optionally, a single inertial sensor may be capable of providing sensing data relative to a plurality of axes. For example, an IMU including a plurality of accelerometers and gyroscopes can be used to generate acceleration data and orientation data with respect to up to six axes of motion.

In some embodiments, one or more inertial sensors may be located at the carrier or the optical assembly. In some cases, the imaging device may comprise at least one inertial sensor attached to a frame component of the carrier. The frame component may support the optical assembly. In some cases, the imaging device may comprise at least an inertial sensor attached to the optical assembly.

The one or more sensors may comprise one or more angular position or angular rotational sensors. The angular position or angular rotational sensors such as encoders may be used to detect a relative angular position of the frame component relative to each other in the frame assembly. For example, a magnetic field sensor or an optical encoder may be used to detect a rotational position of one or more actuators for driving the rotational movement of the carrier. In some cases, the one or more angular position or angular rotational sensors are provided as part of a motor assembly.

The one or more sensors may or may not comprise location sensor(s). The location sensor(s) may include a variety of suitable sensors capable to measure a location of the optical assembly with respect to a reference frame such as a ground reference frame. The location sensors may include, for example, global position system (GPS).

One or more sensors may be located on the carrier. The one or more sensors may be, for example, located on a frame component or any structure of the frame assembly. The one or more sensors may be located at the optical assembly. For example, the one or more sensors may be provided on the circuit board of the optical assembly. In another example, the one or more sensors may be enclosed in the lens barrel.

In some embodiments, the movement of the carrier may be controlled by a controller. In some embodiments, a movement of the optical assembly may be controlled by the controller. The controller may be used for calculating posture information associated with the optical assembly based on the motion and position information obtained by the one or more sensors. For example, detected angular velocity and/or angular position of the optical assembly may be used to calculate the attitude of the optical assembly with respect to a pitch, roll and/or yaw axis of the optical assembly.

Based on the calculated posture of the payload device, one or more motor signals may be generated to control the one or more actuators. The one or more motors may be configured to directly drive the frame assembly to rotate around at least one or a pitch, roll or yaw axis so as to adjust the posture of the optical assembly (e.g., the shooting angle of an imaging device). In some embodiments, the one or more motors can comprise one or more actuators that are configured to actuate one or more components of the frame assembly to move about one or more rotational axes. One or more actuators may comprise one or more motors. A variety of motors may be used such as stepper motor, brushless DC motor, brush DC motor, and DC servo motor. In some embodiments, the motor may be single axis rotary motor. In some embodiments, the motor may be spherical motor. In some embodiments, one or more of the rotational axes (e.g., pitch, roll and yaw) may intersect with the optical assembly. In other embodiments, one or more of the rotational axes may not intersect with the optical assembly.

In some embodiments, the carrier may comprise a plurality of frame components that the rotation order of the payload device is selected to allow the optical assembly to be rotated without the problem of "gimbal lock" under ordinary operational circumstances for the payload device, such as when pointing straight down. For example, in one embodiment, the rotation order may be pitch, roll and yaw from the innermost to outermost rotational axis. In another embodiment, the rotation order may be pitch, roll and yaw from the outermost to the innermost rotational axis. Any rotation order (e.g., pitch/yaw/roll, roll/pitch/yaw, roll/yaw/pitch, yaw/roll/pitch, or yaw/pitch/roll from outermost to the innermost rotational axis, or from innermost to outermost rotational axis) of the optical assembly may be contemplated. In some embodiments, the frame assembly may comprise a spherical actuator in which case the spherical actuator may move a rotor which the optical assembly is attached to about up to three rotational axes. In some case, the spherical actuator may move a rotor around a spherical surface of a stator of the motor.

In some embodiments, controlling the carrier may comprise effecting movement of the carrier based at least in part on a feedback signal. The feedback signal may contain attitude data about the optical assembly. In some embodiments, the movement of the carrier may comprise an angular position, an angular velocity, an/or an angular acceleration of the carrier with respect to one or more axes.

The carrier can include individual carrier frame components, some of which can be movable relative to one another. The carrier actuation assembly can include one or more actuators (e.g., motors) that actuate movement of the individual carrier frame components. The actuators can permit the movement of multiple carrier frame components simultaneously, or may be configured to permit the movement of a single carrier frame component at a time. The movement of the carrier frame components can produce a corresponding movement of the optical assembly. For example, the carrier actuation assembly can actuate a rotation of one or more carrier frame components about one or more axes of rotation (e.g., roll axis, pitch axis, or yaw axis). The rotation of the one or more carrier frame components can cause an optical assembly to rotate about one or more axes of rotation relative to the housing. Alternatively or in combination, the carrier actuation assembly can actuate a translation of one or more carrier frame components along one or more axes of translation, and thereby produce a translation of the optical assembly along one or more corresponding axes relative to the housing of the imaging device. In some embodiments, controlling the carrier may comprise effecting movement of the one or more frame components based in part on the detected attitude data of the optical assembly. In some embodiments, the movement of the carrier may comprise an angular position, an angular velocity, an/or an angular acceleration of the carrier. In some embodiments, the movement of the carrier is effected relative to an inertial reference frame such as the ground. For example, the optical assembly may be stabilized or leveled by the carrier with respect to the ground.

The carrier can be used to stabilize a spatial disposition of an optical assembly. The carrier may allow the optical assembly to have a desired movement. For instance, the carrier can be used to rotate the optical assembly to compensate for undesired movement (e.g. vibration, jittering). The optical assembly may be stabilized in response to an unwanted movement (e.g., vibrations and shaking), and may not be stabilized in response to a deliberate movement (e.g., a walking motion). For example, a low pass filter may be used to smooth out low-frequency motion such as those induced by walking, so that the attitude of the optical assembly may only be stabilized in response to the high-frequency motion such as shaking.

The carrier can be used to control the spatial disposition of an optically assembly. For instance, the carrier can be used to rotate the optical assembly to a desired spatial disposition. The desired spatial disposition can be manually input by a user (e.g., via remote terminal or other external device in communication with the movable object, carrier, and/or imaging device), determined autonomously without requiring user input (e.g., by one or more processors of the movable object, carrier, and/or imaging device), or determined semi-autonomously with aid of one or more processors of the movable object, carrier, and/or imaging device.

The desired spatial disposition can be used to calculate a movement of the carrier or one or more components thereof (e.g., one or more frames) that would achieve the desired spatial disposition of the optical assembly.

Regarding the control system, cascaded proportional-integral-derivative (PID) may be used to control the attitude and velocity of the carrier. It should be noted that there are a variety of control algorithms can be used to control a gimbal or carrier system, including but not limited to: ON-OFF, PID modes, feedforward, adaptive, intelligent (Fuzzy logic, Neural network, Expert Systems and Genetic) control algorithms. For a specific control model, such as PID control, the control system can be different according to different control objective/output variable (e.g., angular velocity, angular position, angular acceleration, or torque) and different input variable (e.g. input voltage). Accordingly, control parameters may be represented in various ways.

The input torque provided to each motor can be determined in a variety of ways, such as using a feedback control loop. The feedback control loop can take the target angle as an input and output the input torque as an input signal to the actuators of the carrier. The feedback control loop can be implemented using one or more of a proportional (P) controller, a proportional-derivative (PD) controller, a proportional-integral (PI) controller, a proportional-integral-derivative (PID) controller, or combinations thereof. The PID controller may comprise the one or more processors. The PID controller may be located on the carrier. The PID controller can be located remotely from the carrier. The PID controller for example can be located at the base support.

As described elsewhere herein, the PID controller may be configured to determine an input angular velocity based on a difference between the target angle and an angle measure by the inertial sensor(s). The PID controller may be configured to determine the input torque based on a difference between the input angular velocity and an angular velocity measured by the inertial sensor(s).

In some embodiments, one or more processors may be configured to calculate the attitude data of the optical assembly. In some embodiments, the one or more processors may be a programmable processor (e.g., a central processing unit (CPU) or a microcontroller), a field programmable gate array (FPGA) and/or one or more ARM processors. In some embodiments, the one or more processors may be operatively coupled to a non-transitory computer readable medium. The non-transitory computer readable medium can store logic, code, and/or program instructions executable by the one or more processors unit for performing one or more steps. The non-transitory computer readable medium can include one or more memory units (e.g., removable media or external storage such as an SD card or random access memory (RAM)).

The one or more processors may be the same processors 111 as described in FIG. 1. The one or more processors may not be supported by the carrier. Alternatively, the one or more processor maybe supported by the carrier. The one or more processors may be located at any frame component of the carrier. The one or more processors may be enclosed in the housing.

In the exemplary configuration of an imaging device illustrated in FIG. 2, the optical assembly is supported by a carrier. The carrier may be multi-axis gimbal. The carrier may comprise a plurality of frame components operably coupled to a plurality of motors. The plurality of motors are configured to actuate the plurality of frame components to rotate about two or more axes of rotation. Both the optical assembly and the carrier are enclosed in a housing of the imaging device. The carrier may be capable of causing the optical assembly to move relative to the housing of the imaging device around and/or along to roll, pitch and yaw axis. In some embodiments, the roll axis may be substantially parallel to an optical path or optical axis for the optical assembly. The carrier may cause the optical assembly to rotate around one or more of the roll axis, pitch axis and yaw axis based on control signals provided to motors of the carrier.

The imaging device 200 may be a standalone imaging device. The imaging device can be carried by a living subject. The imaging device may be, for example, held or grasped by a human hand. The imaging device may or may not be coupled to other objects. The imaging device may or may not be in electrical communication with other devices. The imaging device may comprise a housing enclosing an optical assembly and one or more non-optical components. The imaging device may further comprise a carrier arranged inside the housing. The optical assembly is supported by the carrier and at least one of the non-optical components is not supported by the carrier (e.g., battery positional sensor, storage medium, motors, circuitry, power supply, processor, or processor). As illustrated in the exemplary embodiment, the carrier is a three-axis gimbal. It should be noted that the carrier can also be single-axis, two-axis gimbal.

The imaging device can be used in combination with any of the systems, devices, and methods described herein. The imaging device may be integrated with other system and devices. The imaging device may be operably coupled to other systems or devices. The systems and devices may include, among other things, desktop computers, laptops or notebook computers, mobile devices (e.g., smart phones, cell phones, personal digital assistants (PDAs), and tablets), or wearable devices (e.g., smartwatches). The other systems and devices can also include any other media content player, for example, a set-top box, a television set, a video game system, or any electronic require an imaging device or cameras. The imaging device can be carried by a movable object (not shown), such as a living subject, a vehicle, a UAV and the like.

In the depicted example imaging device 200, the carrier 205 includes a first frame 211-1 rotatably coupled to the optical assembly 203 and a second frame 211-2 coupled to the first frame 211-1. In the depicted example imaging device 200, the first frame is a pitch frame that is actuated by a pitch actuator in order to rotate the carrier about a pitch axis 210-2. The second frame 211-2 is a yaw frame that is actuated by a yaw actuator in order to rotate the carrier and optical assembly about a yaw axis 210-3. The carrier can also include a roll actuator configured to rotate the optical assembly about a roll axis 210-1. The actuators (e.g., roll actuator, pitch actuator, yaw actuator) can each apply a torque to rotate the respective frame or optical assembly about the corresponding axis of rotation. Each actuator can be a motor including a rotor and a stator. For instance, the yaw actuator can include a rotor coupled to the yaw frame (second frame 211-2) and a stator coupled to the housing 201 of the imaging device, or vice-versa. However, it shall be appreciated that alternative configurations of the carrier can also be used (e.g., less than or more than two frames, the second frame 211-2 may be a pitch frame or a roll frame rather than a yaw frame, the first frame may be a pitch frame or a yaw frame rather than a roll frame). In some cases, as described elsewhere herein, the carrier may comprise a spherical motor such that the all the three rotational axes may intersect at a center of the spherical motor.

In some embodiments, the imaging device may be coupled to another object. The imaging device may be rotatably coupled to another object. The imaging device may be actuated to rotate about one or more axes relative to the object it is coupled to. In some cases, the imaging device may be coupled to another object via an external carrier such as a gimbal platform. The external carrier may have any characteristics of the internal carrier as described elsewhere herein. In some cases, the housing of the imaging device may be configured to be coupled to a base support. The base support may be located on or carried by at least one selected from the following: a movable object, stationary object, or a living subject. In some cases, the movable object may comprise an aerial vehicle, a land-based vehicle, or a handheld mount. In other embodiments, the housing may be rigidly coupled to the base support. In this case, the housing of the imaging device may not be configured to rotate relative to the base support.

The base support may be configured to couple the imaging device to a movable object. In some embodiments, the imaging device may be coupled to the movable object via at least one motor. The base support may be rigidly coupled to the movable object. The base support may be releasably coupled to the movable object. The base support may or may not be movable relative to the movable object. In some cases, the housing of the imaging device may be coupled to the base support. In some embodiments, the rotational axes that the frame is configured to rotate about may comprise at least one of a pitch axis, roll axis, or yaw axis.

In some embodiments, the housing of the imaging device may be rotatably coupled to a base support via at least one motor. The housing may be attached to a rotor of the motor and the base support may be attached to a stator of the motor. Alternatively, the housing may be attached to a stator of the motor and a rotor of the stator may be attached to the base support. In some embodiments, the motor may be configured to rotate the housing about an axis of rotation relative to the base support. The axis of rotation of the housing may be a yaw axis. The axis of rotation may be a pitch axis. The axis of rotation may be a roll axis. The axis of rotation of the housing may be parallel to at least one axis of rotation of the carrier. In the exemplary configuration of FIG. 2, the housing 201 may be rotatable relative to a base support about a rotational axis parallel to the yaw axis 210-3, or the pitch axis 210-2. The axis of rotation of the housing may be oblique to at least one axis of rotation of the carrier.

In some embodiments, the axis of the rotation of the housing may be orthogonal to at least one axis of rotation of the carrier. The axis of rotation of the housing may intersect with at least one axis of rotation of the carrier. In some embodiments, the motor for rotating the housing may be configured to rotate the stator relative to the base support about a yaw axis, and the carrier may be configured to rotate the optical assembly relative to the housing about at least one of a pitch axis or roll axis. The motor for rotating the housing and the carrier for supporting the optical assembly may be configured to stabilize or control an attitude of the optical assembly in a collaborative way. For instance, the carrier may be configured to rotate the optical assembly about one or two axis (e.g., roll, pitch axis) and the housing may be configured to rotate about an axis orthogonal to the rotational axis of the carrier, in which way the optical assembly can be rotated about the rotational axes of the carrier and the rotational axes of the housing.

In some embodiments, one or more controllers may be used to stabilize a movement of the optical assembly or control an attitude of the optical assembly by controlling the movement of the housing and/or the movement of the carrier. In some cases, one controller may be used for controlling a rotational movement of the housing and/or the carrier. The controller may be located inside the imaging device. The controller may be arranged inside the housing while not supported by the carrier. Alternatively, the controller may be located at the base support or the movable object the base support is fixed to. The controller may generate input signals to both the motor attached to the housing and the motors attached to the carrier. The input signals may be generated at least based on the sensor data indicative of a current position or location state of the optical assembly and the sensor data indicative of a rotational position or velocity of the one or more actuators. Alternatively, a separate controller may be provided for controlling the rotational movement of the housing or the imaging device as a whole. The separate controller may be provided on the base support or the movable object. The separate controller may be in communication with the controller for controlling the movement of the carrier. The two controllers may work together to control an attitude of the optical assembly. For instance, one controller may be configured to generate control signal to the actuator for moving the housing and the other controller may be configured to generate control signal to the actuators for moving the frame components of the carrier within the housing. In some cases, the separate controller may be configured to control an external carrier that supports the housing or the imaging device as a whole. The external carrier may be configured to move the housing or the imaging device as a whole about one or more rotational axes.

One or more sensors may be configured to detect an angular position or angular velocity of the one or more actuators. The one or more sensors may be attached to the motor(s) for actuating the housing and the motor(s) for actuating the frame components of the carrier. The one or more sensors may comprise angular position or angular rotational sensors. The angular position or angular rotational sensors such as encoders may be used to detect a relative angular position of the frame component relative to each other in the carrier. The angular position or angular rotational sensors may be used to detect a relative angular position of the housing relative to a base support. For example, a magnetic field sensor or an optical encoder configured to detect a rotational position of one or more actuators for driving the rotational movement of the housing relative a base support.

The one or more sensors may include sensors configured to detect or obtain motion and position information associated with the optical assembly. The motion and position information may include velocity, orientation, attitude, acceleration, position, and/or any other physical state experienced by the optical assembly.

In some embodiments, one or more inertial sensors may be located to the carrier or the optical assembly. In some cases, the imaging device may comprise at least one inertial sensor attached to a frame component of the carrier. The frame component may support the optical assembly. In some cases, the imaging device may comprise at least inertial sensor attached to the optical assembly. For example, the inertial sensor may be provided on the PCB board of the optical assembly.

Figure 4:
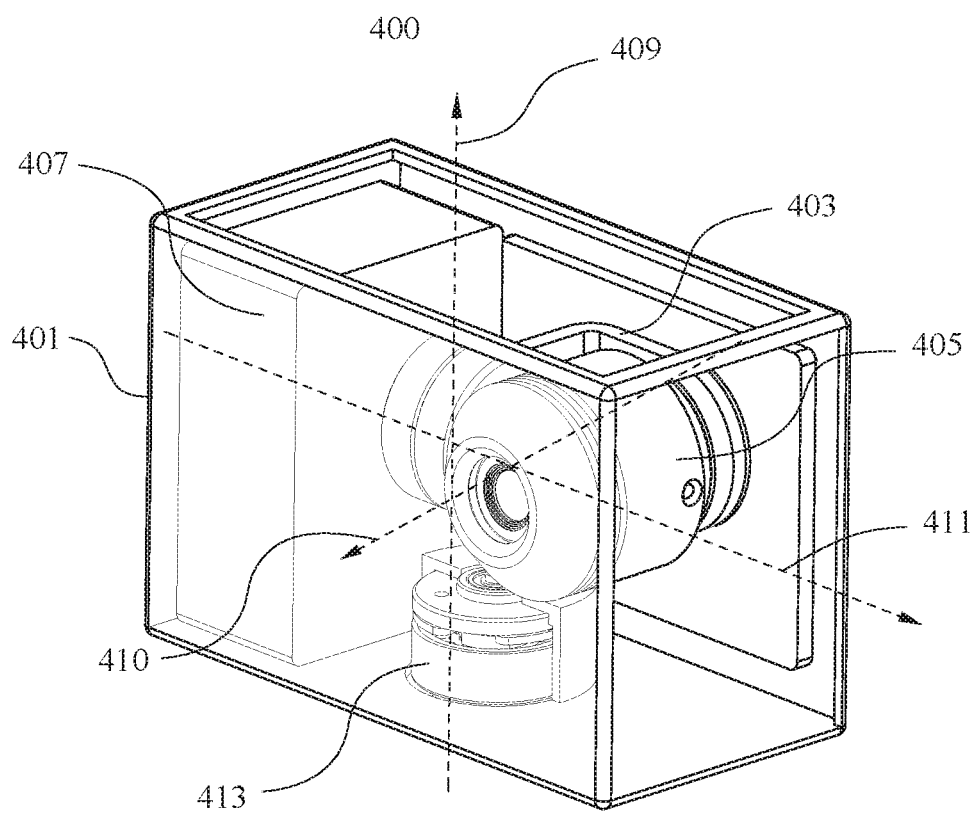
FIG. 4 illustrates an exemplary embodiment of an imaging device with a rotatable housing 401, in accordance with embodiments of the disclosure.

FIG. 4 illustrates an exemplary embodiment of an imaging device 400 with a rotatable housing 401, in accordance with embodiments of the disclosure. The imaging device may comprise an optical assembly 405 supported by a carrier 403. The optical assembly can be the same optical assembly as described in FIG. 2. The imaging device may comprise a plurality of non-optical components such as a battery 407 and one or more processor (not shown). At least one of the non-optical assembly is not supported by the carrier. The housing 401 may enclose the plurality of non-optical components and the optical assembly supported on the carrier. The housing 401 may be coupled to a base support (not shown) via a motor 413. The base support may be attached to a movable object. The base support may be rigidly coupled to a movable object. The base support may be integrally formed with a movable object. The base support may or may not be configured to move relative to the movable object.

The housing may be controlled to move relative to the base support. In some embodiments, a movement of the optical assembly may be stabilized or controlled by controlling a movement of the housing and a movement of the carrier within the housing. A movement of the optical assembly may be stabilized by controlling movement of the housing or movement of the carrier individually or collectively.

The housing may be rotatably about an axis of rotation relative to the base support. The rotational axis may be a yaw axis 409. The carrier may comprise one or more rotational axes. In the depicted embodiment, the carrier is configured to rotate the optical assembly about a roll axis 410 and a pitch axis 411. The carrier includes a frame component rotatably coupled to the optical assembly. In the depicted embodiment, the frame is a pitch frame that is actuated by a pitch actuator in order to rotate the carrier about a pitch axis 411. The carrier may be rotatably coupled to the housing. The carrier may be rotatably coupled to the housing via one or more non-optical components. As depicted in the embodiment, the carrier is rotatably coupled to the battery inside the housing. The carrier can also include a roll actuator configured to rotate the optical assembly about a roll axis 410. The imaging device may include a yaw actuator in order to rotate the carrier and optical assembly about a yaw axis 409. The yaw actuator may be configured to couple the housing 401 to a base support (not shown). The carrier, optical assembly, non-optical components and the housing may be rotatable about the yaw axis. The actuators (e.g., roll actuator, pitch actuator, yaw actuator) can each apply a torque to rotate the respective frame or optical assembly about the corresponding axis of rotation. Each actuator can be a motor including a rotor and a stator. For instance, the yaw actuator can include a rotor coupled to the housing and a stator coupled to the base support, or vice-versa. However, it shall be appreciated that alternative configurations of the carrier can also be used. For example, the carrier may comprise two or more frame components, the first frame component may be a pitch frame or a roll frame and the second frame component may be a roll frame, pitch frame, or yaw frame. The housing can be rotated about various different rotational axes that may or may not be orthogonal to the rotational axis of the carrier. For example, the rotational axis of the housing may be a roll axis or pitch axis rather than a yaws axis. The rotational axis of the housing may be orthogonal to the rotational axis of the carrier. Alternatively, the rotational axis of the housing may be parallel to one of the axis of the carrier.

A fraction of the total mass of the imaging device may be supported by the carrier. The carrier may be configured to support one or more components of the imaging device which may constitute no more than 1%, 5%, 10%, 15%, 20%, 25%, 30%, 35%, 40%, 45%, 50%, 55%, 60%, 70%, 80%, 90% of the total mass of the imaging device. The one or more components may be an optical assembly including one or more lenses, filters and the like. In some cases, the one or more components may include some optical components such as one or more lenses, filters and non-optical components such as motion/positional sensors, circuitries, or memory units. In some cases, one or more non-optical components may not be supported by the carrier. The one or more non-optical components may constitute at least 10%, 20%, 30%, 40%, 50%, 60%, 70%, 80%, 90% of the total mass of the imaging device. In some cases, one or more non-optical components may be supported by a frame component of the carrier. The frame component may not be a first frame component of the carrier that is configured to support an optical assembly.

Figure 5:
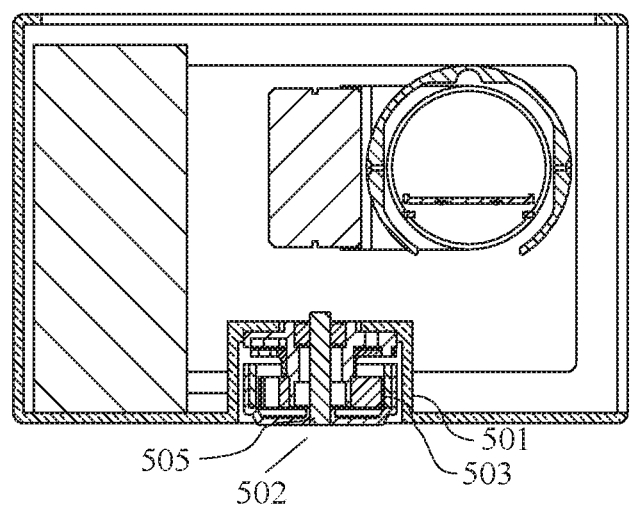
FIG. 5 illustrates another view of the embodiment in FIG. 4.

FIG. 5 illustrates another view of the embodiment in FIG. 4. The housing 501 corresponds to the housing 401 in FIG. 4. The motor 502 comprises at least a stator and a rotor. In some embodiments, the housing may be rigidly coupled to the stator 503 of the motor 502. The rotor 505 of the motor 502 may be coupled to an external object such as a base support (not shown). Alternatively, the housing may be rigidly coupled to a rotor of the motor and the stator may be coupled to the base support. In some cases, the housing may have a shape for fitting or coupling to the motor. The motor may be connected to the housing on any side or any surface. In the depicted embodiment, the housing is coupled to the motor through a bottom side. The housing can be coupled to the motor through a left side, right side, rear side, front side, and/or top side. In some cases, the actuator may be part of the carrier for controlling the movement of the optical assembly of the imaging device. In this case, the carrier may be considered to be partially enclosed by the housing.

In some embodiments, the imaging device is a standalone device. For instance, the housing may be separated from other objects without mechanical attachment. The imaging device may be a handheld device. For instance, a user may hold the imaging device with the carrier completely enclosed by a housing of the imaging device. The imaging device may be attachable to other surfaces or objects with attachment means. For instance, a housing of the imaging device may be releasably attached to other surfaces or devices without using of a tool. In some embodiments, the imaging device may be integral to other devices, objects or systems. The housing may be connected to other objects which may or may not be movable. In some cases, the housing may be connected to a movable object such as a UAV. The housing may be integrally formed with a part of the movable object. The housing may be releasably coupled to the movable object. The housing may be affixed to the movable object such that the housing is not movable relative to the movable object. The housing may be rotatably coupled to the movable object. The housing may be coupled to the UAV via a carrier. The carrier may be enclosed in the housing. The carrier may be partially outside the housing. In some cases, an additional carrier may be provided to connect the housing to the UAV where the carrier is external to the housing.

The imaging device may be a payload and/or vision sensor of a UAV. In some cases, the imaging device may be a payload carried by the UAV. The imaging device may be supported by the UAV via a connector. In some cases, the connector may connect the imaging device to the UAV via one or more dampening elements. The dampening element can mitigate the effect of motion of the movable object on the payload. The dampening element may be part of an intermediary connection between the connector and the movable object. In some embodiments, the dampening element may be a vibration dampening system. The vibration dampening system may be configured to isolate the connector and elements directly or indirectly connected to the connector (e.g., stabilizing unit, payload, etc) from the vibration motion of movable object. The vibration dampening system may be configured to reduce the effect of vibrations of the movable object on the connector. This may result in a greater than or equal to 10%, 20%, 30%, 40%, 50%, 60%, 70%, 80%, 90%, 95%, 99%, or 99.9% reduction. In some instances, the vibration dampening system may be configured to reduce or remove effects of high frequency vibrations of the vehicle (e.g., greater than 2 Hz, 3 Hz, 5 Hz, 10 Hz, 20 Hz, 30 Hz, 40 Hz, or 50 Hz), by any amount as described herein. The vibration dampening system may stabilize the stabilizing unit, the payload, and/or the movable object.

In some instances, the vibrational dampening system may comprise a plurality of elastomers configured to stabilize the payload, stabilizing unit, and/or the movable object. For example, one, two, three, four, five, six, seven, eight, nine, ten or more circular elastomers may be provided. The circular elastomers may connect the movable object to a rigid frame configured to directly connect to the connector. The vibrational dampeners may be used to support the connector as the term has been used throughout. For example, the vibrational dampeners may support a weight of the connector (e.g., and the payload). For example, the vibrational dampeners may hold the connector in place. In some instances, the vibrational dampening system may comprise springs. The vibrational dampeners may minimize vibrational motions (e.g., shaking) caused by operation of propulsion units of the movable device such as a UAV. For example, the vibrational dampeners may absorb vibrational energy generated (e.g., kinetic energy) and convert it to thermal energy, thereby stabilizing the system (e.g., UAV, stabilizing unit, and/or payload).

In some cases, the imaging device may be a vision sensor of the UAV and the imaging device may be in communication with one or more processors on-board or remotely from the UAV. The imaging device may be in communication with the UAV or a remote controller of the UAV. In some cases, the imaging device may be in communication with a display.

The display may be configured to show images captured by the imaging device. In some cases, the display may be comprised by the imaging device. For instance, the display may be integrally formed with a housing of the imaging device. In some cases, the display may be located at a remote controller of the UAV. The communication may be one-way communication, such that data can be transmitted in only one direction. For example, one-way communication may involve only the imaging device transmitting image data to the display, UAV, remote controller, or vice-versa. Alternatively, the communication may be two-way communication, such that data can be transmitted in both directions between the movable object, the remote controller, display and the imaging device. The one-way or two-way communication can involve transmitting data from one or more transmitters of a communication system of the UAV, remote controller, or display, to one or more receivers of the communication unit of the imaging device, and vice-versa. A communication unit may be a non-optical component that is not supported by a carrier. Alternatively or in addition, a communication unit may be supported by the carrier.

The imaging device may transmit image data to a remote controller. The image data may be transmitted wirelessly with aid of a transmitter on-board the imaging device. The image data may be transmitted to the remote controller using direct communications. Direct communications may be provided between the movable object/imaging device and the remote controller. The direct communications may occur without requiring any intermediary device or network. The image data may be transmitted to the remote controller using indirect communications. Indirect communications may be provided between the movable object/imaging device and the remote controller. The indirect communications may occur with aid of one or more intermediary device or network. For instance, indirect communications may utilize a telecommunications network. Indirect communications may be performed with aid of one or more router, communication tower, satellite, or any other intermediary device or network. Examples of types of communications may include, but are not limited to: communications via the Internet, Local Area Networks (LANs), Wide Area Networks (WANs), Bluetooth, Near Field Communication (NFC) technologies, networks based on mobile data protocols such as General Packet Radio Services (GPRS), GSM, Enhanced Data GSM Environment (EDGE), 3G, 4G, or Long Term Evolution (LTE) protocols, Infra-Red (IR) communication technologies, and/or Wi-Fi, and may be wireless, wired, or a combination thereof. Alternatively, the imaging device may provide image data to the movable object and/or the carrier. The image data may be provided via a wired or wireless connection. The movable object and/or carrier may in turn transmit the image data to the remote controller.

The carrier may comprise one or more actuators configured to actuate movement of the optical assembly. In some embodiments, the one or more actuators may comprise a single-axis motor. In some embodiments, the carrier may be a ball joint gimbal arranged within the camera housing. In some embodiments, the carrier may include spherical motor assembly. The spherical motor may be configured to rotate the optical assembly about one or more axes of rotation. The spherical motor can rotate about multiple axes. The spherical motor can rotate omnidirectionally. The spherical motor may comprise a spherical stator and a spherical rotor. The spherical rotor may be movable relative to the spherical stator. In some cases, the optical assembly may be coupled to the spherical rotor. In some cases, the optical assembly may be coupled to the spherical stator.

The spherical motor assembly may use different types of driving techniques. For example, the motor is driven by piezoelectric actuators. The spherical motor may comprise a spherical stator and a plurality of piezoelectric actuators, and the motor is driven by frictional driving forces. In another example, the motor is driven by electro-magnetic permanent magnets. Various other driving mechanisms can be used for actuating the spherical motor. For example, the spherical actuator can be driven by mechanical means using multiple single axis rotary motors and wires in way of parallel mechanism. The actuators and stators may or may not be in contact.

Figure 6:
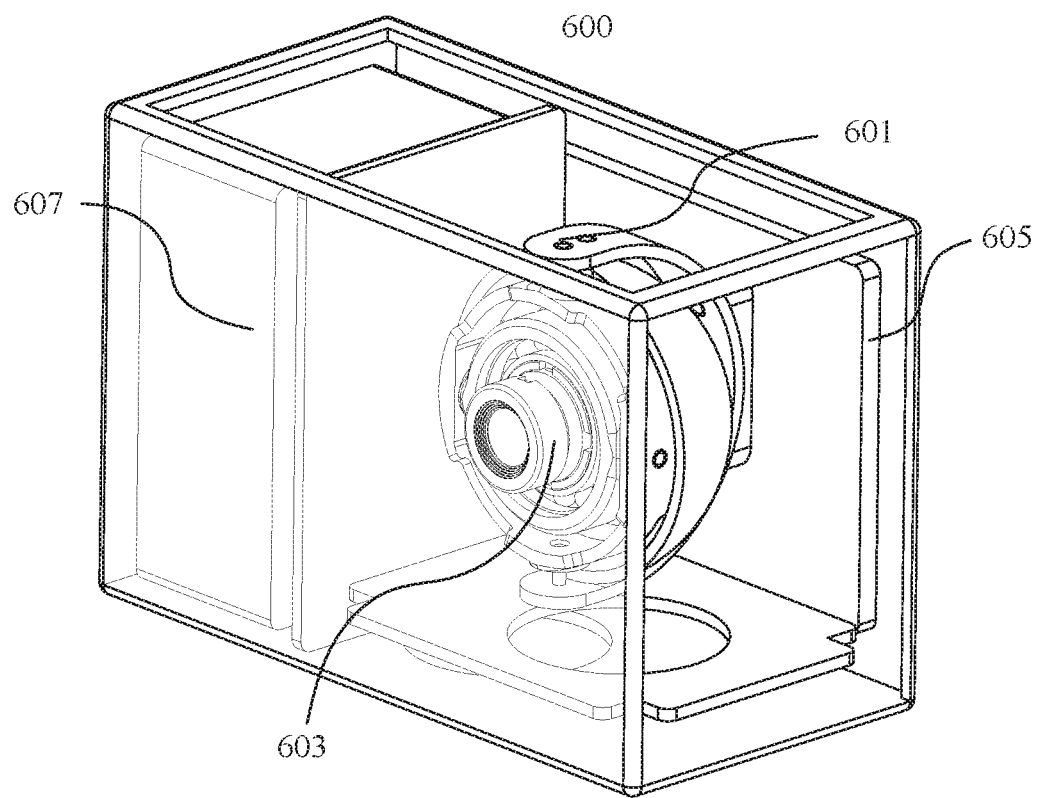
FIG. 6 illustrates an exemplary embodiment of the imaging device comprising a carrier actuated by a spherical motor.

FIG. 6 illustrates an exemplary embodiment of the imaging device 600 comprising a carrier actuated by a spherical motor. The imaging device 600 may comprise a carrier 601 arranged inside a housing 605 of the imaging device. The housing can be the same housing as described elsewhere herein. An optical assembly 603 may be supported by the carrier 601. One or more non-optical components may not be supported by the carrier.

The carrier may comprise a spherical gimbal. The spherical gimbal may be configured to rotate the optical assembly about one or more rotational axis. In some embodiments, the imaging device as a whole or a housing of the imaging device is not configured to rotate relative to an external object such as a movable object it is attached to. In alternative embodiments, the housing of the imaging device may be coupled to another movable object via at least one motor. The housing may be configured to rotate about at least one rotational axis relative to the movable object. In the exemplary embodiment, the spherical motor is driven by electromagnetic forces. In addition to the electro-magnets spherical motor, the spherical motor can be ultrasonic spherical motor, spherical stepping motor, and spherical induction motor.

Figure 7:
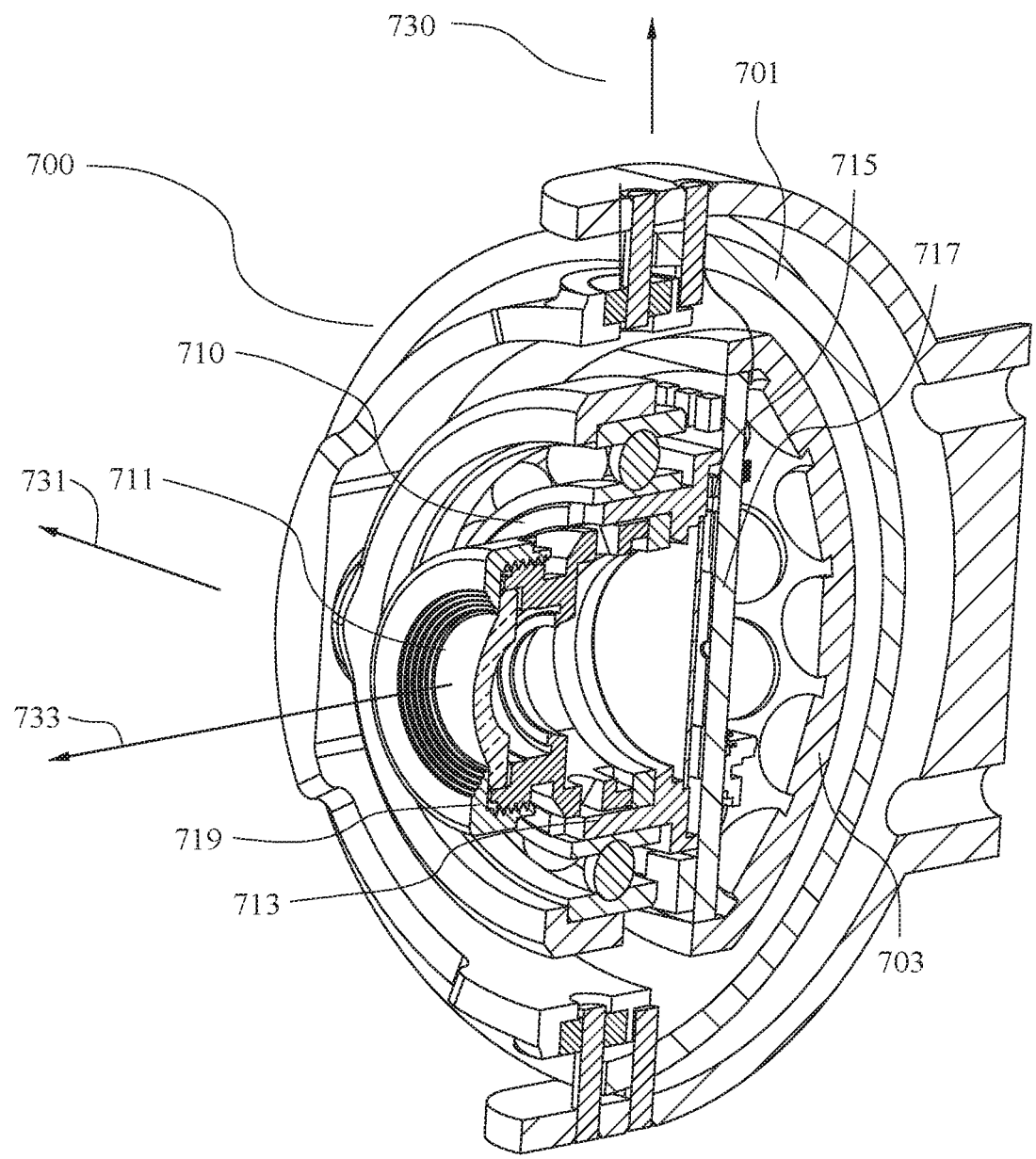
FIG. 7 illustrates an optical assembly supported by a spherical motor.

The optical assembly may be attached to a rotor of the spherical motor. FIG. 7 illustrates an optical assembly 710 supported by a spherical motor 700. The spherical motor may comprise at least a stator 701 and a rotor 703. The optical assembly may be rigidly coupled to the rotor. The optical assembly may comprise one or more lenses 711 and one or more image sensors 715. In some cases, the image sensor may be provided on a circuit board. The circuit board may be supported by a substrate holder 717. The circuit board may comprise a plurality of electronic elements configured to process the signals captured by the image sensor. In some cases, an output data (image data) of the circuit board may be transmitted to at least one of the non-optical component such as the processors for further data processing.

In some cases, the optical assembly may comprise other components such as filters, iris, condensers and the like which influences light or photons captured by the image sensor. The optical assembly may also comprise elements for various optical functions such as zooming. For example, the optical assembly may comprise one or more motors for adjusting a distance between the one or more lenses, optical components and the image sensor along an optical axis (primary axis). The optical assembly can be the same as described in FIG. 3.

In some embodiments, the one or more lenses 711 may be supported by a lens barrel. The one or more lenses may be partially enclosed in the lens barrel 713. For instance, one or more of the lenses may be supported by a holder coupled to the lens barrel. In other cases, the one or more lenses may be fully enclosed within the lens barrel.

In some embodiments, the lens barrel 713 may be coupled to a rotor of the spherical motor. The lens barrel may be rigidly attached to the rotor of the spherical motor. The lens barrel may be directly coupled to the rotor. The lens barrel may be coupled to the rotor via additional connecting elements. The lens barrel may be releasably coupled to the rotor. The lens barrel may be integrally formed with the rotor. The lens barrel may not move relative to the rotor it is coupled to. The lens barrel may be directly or indirectly fixed to the rotor. In the depicted exemplary configuration, the rotor may be in direct contact with the lens barrel via an inner ring of a ball bearing. In other case, lens barrel may be fixedly attached to the rotor via any other suitable structures. In some cases, when the lens barrel is attached to the gimbal frame, the movement of the lens barrel may be stabilized with respect to one, two, three or more rotational axes.

In some embodiments, the image sensor 715 may be provided on a circuit board, both of which are supported by the lens barrel. Alternatively, the image sensor may not be provided on an external circuit board. The circuit board or the image sensor may be supported by a substrate holder 717. The substrate holder may be coupled to the lens barrel. In some cases, the substrate holder may be fixed to the lens barrel. The substrate holder may be integrally formed with the lens barrel. The substrate holder may or may not be rigidly attached to the rotor.

In the exemplary configuration, the substrate holder 717 may be rigidly coupled to the rotor 703. The rotor may actuate the optical assembly to rotate about one or more axes via the substrate holder, lens barrel and one or more other supporting components. For instance, the one or more lenses may be supported by a lens carrier 719 which is in turn coupled to the lens barrel. In some cases, the substrate holder and the lens carrier may be configured to move relative to one another along the optical axis such that a distance of the one or more lenses from the image sensor may be adjusted. The distance changing between the one or more lenses and the image sensor may be controlled to achieve optical functions such as zooming. In some cases, the image sensor or circuit board may be movable along the optical axis to adjust a distance of the image sensor from the one or more lenses. In some cases, the image sensor/circuit board and the lens carrier are both movable along the optical axis to adjust a distance of between the image sensor and the one or more lenses.

In some cases, the lens barrel may be rigidly attached to rotor of the spherical motor and the substrate holder is movable relative to the rotor. In some cases, the substrate holder is rigidly attached to a rotor of the spherical motor and the lens carrier is movable relative to the rotor. In some cases, both of the lens barrel and the substrate holder may be rigidly attached to rotor of the spherical motor.

It should be noted that the rotor and stator of the spherical motor is a relative notion with respect to one another. In the depicted configuration, the optical assembly is attached to the inner movable portion of the spherical motor (rotor) and the outer movable portion of the spherical motor is attached to the housing (stator). Alternatively, the inner movable portion of the spherical may comprise suitable structures such as a shaft to allow the housing rigidly coupled to the rotor and the optical assembly is rigidly coupled to the stator of the spherical motor.

The optical assembly may be allowed to move relative to the housing. The optical assembly may be permitted to have a rotational movement about one, two or three axes with respect to the housing. The optical assembly as supported by the carrier may be able to rotate about one or more axes of rotation relative to one or more non-optical components within the camera housing. The spherical motor of the carrier may permit the optical assembly to move about multiple axes. The optical assembly may be rotatable about at least one of the following axes: yaw axis 730 and pitch axis 731 relative to the non-optical components or the housing. The optical assembly is rotatable about at least two of the following axes: yaw axis, pitch axis, and roll axis 733 relative to the non-optical components or the housing. The two or more of the axes of rotation may be orthogonal to one another (e.g., roll axis, pitch axis, yaw axis). The two or more of the axes of rotation may be non-orthogonal to one another (e.g., movement around a spherical surface).

The housing may or may not be controlled to move relative to a movable object that the imaging device is attached to. Accordingly, the one or more non-optical components may or may not move relative to the movable object. The one or more non-optical components may be attached to an inner surface of the housing such that the one or more non-optical components may be stationary relative to the housing. In some embodiments, the housing may be configured to rotate about one or more axes relative to a base support. The one or more non-optical components may accordingly be controlled to rotate about one or more axes relative to the base support. The method for actuating the housing is described elsewhere herein. The rotational axis of the housing may or may not be orthogonal to the rotational axes of the spherical motor. For example, the spherical motor may be configured to rotate the optical assembly about a pitch axis and a roll axis and the housing may be configured to rotate about a yaw axis. Alternatively, the spherical motor maybe configured to rotate the optical assembly about three rotation axes (e.g., roll, pitch, yaw axis) and the housing is configured to rotate about an axis (e.g. roll axis) that is parallel to the rotational axis of the carrier.

Figure 8:
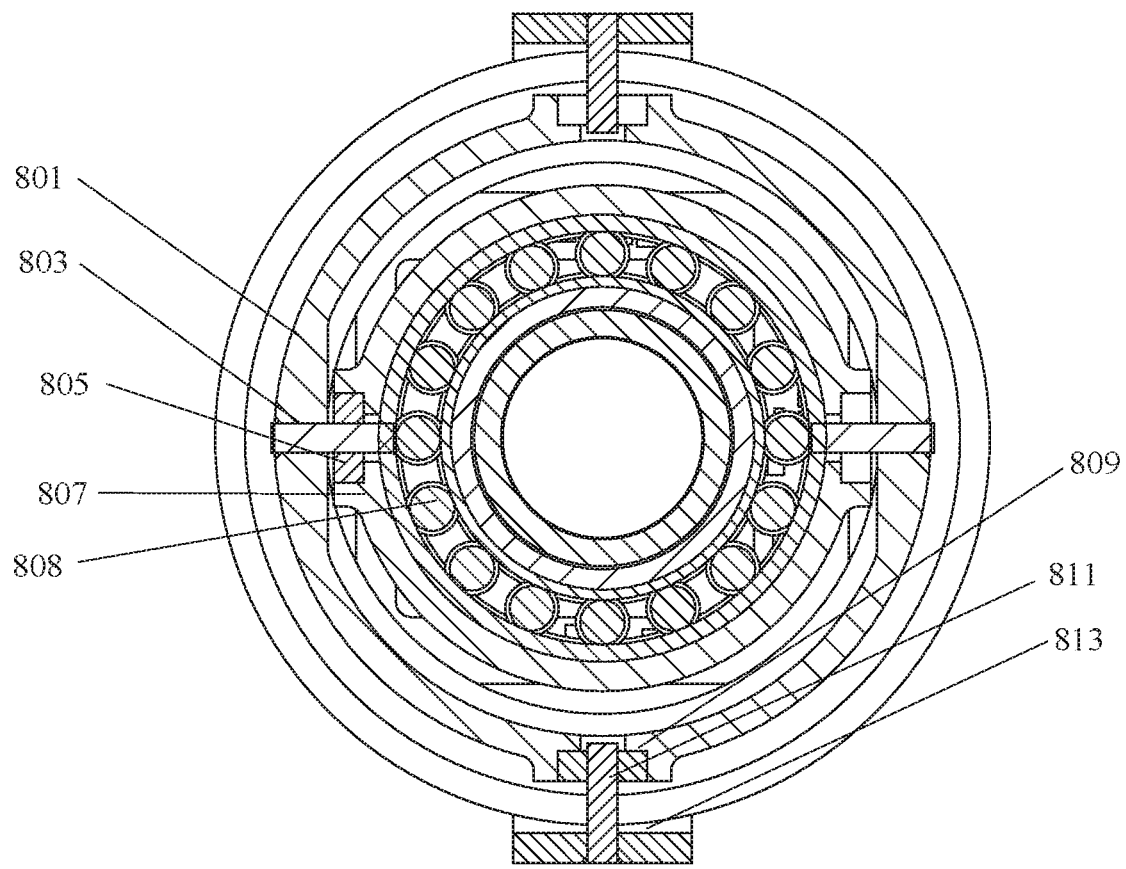
FIG. 8 illustrates another view of the exemplary embodiment shown in FIG. 7.

FIG. 8 illustrates another view of the exemplary embodiment shown in FIG. 7. A primary axis of the optical assembly may or may not be aligned with a rotational axis of the spherical motor. In the example, the primary axis of the optical assembly may be aligned with a roll axis (perpendicular to the paper). The carrier may comprise spherical motor and additional components for coupling the motor to the housing. The additional components may be configured to support a rotor of the spherical motor. The additional components may include at least one or more supporting members and shafts. In the exemplary configuration, the spherical motor may be configured to rotate the optical assembly about three axes (e.g., roll axis, pitch axis and yaw axis). The spherical motor may be supported by a pitch-axis assembly including a supporting member 801 coupled to a pitch shaft 803 and bearings 805, a roll-axis assembly including a supporting member 807 coupled to a roll shaft and bearings 808, a yaw-axis assembly including a supporting member 813 coupled to a yaw shaft 811 and bearings 809. In some cases, the plurality of additional components may serve as guiding rails. For instance, one or more encoders or location sensors may be attached to the components associated with each rotational axis for detecting an angular position or rotational movement of the rotor with respect to the rotational axis.

Figure 9:
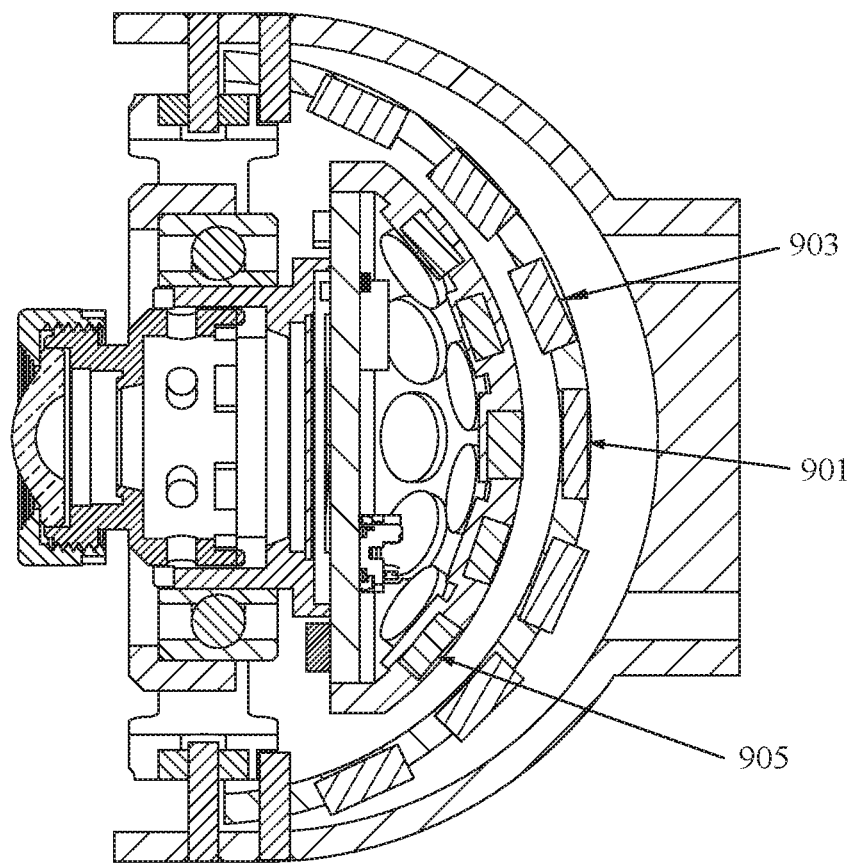
FIG. 9 illustrates a carrier actuated by an electro-magnetic spherical motor for supporting an optical assembly.

The spherical motor can be driven may various mechanisms as described elsewhere herein. For example, the spherical motor can be driven by electromagnetic forces. Alternatively, the spherical motor can be ultrasonic spherical motor, spherical stepping motor, spherical induction motor, and ultrasonic piezoelectric motor. The spherical motor can take a number of forms which include but not limited to induction, direct current, stepper, variable-reluctance, and ultrasonic motor. FIG. 9 illustrates a carrier actuated by an electro-magnetic spherical motor for supporting an optical assembly. The spherical motor may comprise a stator 903 and a rotor 905. The motor may be, for example, a permanent magnetic spherical motor. The rotor may be actuated to move relative to the stator by electro-magnetic forces. For instance, a plurality of permanent magnetic poles may be distributed on the stator and rotor for generating a magnetic field to drive a rotational movement of the rotor. The electro-magnets on the stator may be excited to be north or south magnetic poles so as to rotate the rotor in a desired angle velocity. In some cases, the stator may be rigidly coupled to a housing of the imaging device and the rotor may be coupled to the optical assembly. Alternatively, the stator may be rigidly coupled to the optical assembly and the rotor is coupled to the housing.

In some embodiments, the spherical motor may be driven by a plurality of piezoelectric actuators. The piezoelectric actuators may be configured to move a rotor about one or more axes with respect to the stator of the spherical motor. The rotor may be a frame. The rotor may be fixed to a frame which is configured to support a payload. The payload may include an optical assembly to be stabilized. The actuators may be in contact with the spherical stator such that a friction force may be generated to drive the frame and the optical assembly to move with respect to up to three degrees of rotation. The spherical motor assembly may be based on ultrasonic techniques. In some embodiments, the spherical stator and the plurality actuators are referred to as spherical ultrasonic motor. In some cases, there is no intermediate motion transmission (e.g., gear train) to transmit the engine's motion to the output devices, such that the spherical ultrasonic motor assembly may have increased power efficiency. The ultrasonic motor may have high output torque without a reduction gear and holding torque for braking. The use of direct-drive motors offers reduced energy consumption while allowing for continuous control of the motor speed. Thus, the pointing direction of the imaging device may be quickly adjusted (e.g., to point at a moving target). In some cases, a predetermined position or posture of the imaging device may be maintained. Further, the imaging device may be stabilized against unwanted movement such as vibrations or shakes caused by the movable object or other external factors.

In some embodiments, the carrier within the housing of the imaging device may be a spherical motor comprising a stator, a frame and a plurality of actuators. The frame is configured to rotate relative to the stator about one or more rotational axes via a plurality of piezoelectric actuators that connect the frame and the stator and the frame.

In some embodiments, the piezoelectric actuators may be piezoelectric vibrator elements that can be powered by electric voltage (e.g., AC voltage). The input voltage may be at ultrasonic frequency or near ultrasonic frequency. For example, the frequency of the input voltage can be the same or above 0.1 kHz, 0.5 kHz, 1 kHz, 10 kHz, 20 kHz, 25 kHz, 30 kHz, 40 kHz, 50 kHz, etc. The position and angular velocity of the actuators and the spherical stator relative to each other may be controlled by the input voltage such as a phase difference or phase shift, a frequency of the voltage or a combination thereof. When an AC voltage is applied to the piezoelectric actuators, a standing wave may be generated. The piezoelectric actuator elements may expand or contract depending on the pole direction. Traveling waves may be negated by a combination of two stationary waves. The piezoelectric actuators may transmit energy to the spherical stator through contact with the stator. Various characteristics of the input signal such as amplitude, phase shift, frequency, etc can be used to control the actuators.

The position, generated torque and/or angular velocity of the ultrasonic motor can be controlled by the phase difference and/or the driving frequency of the input voltage and other factors such as the amplitude. For instance, the position control or torque control of the ultrasonic motor can be controlled by a variable phase and fixed frequency, fixed phase and variable frequency, and variable phase and frequency.

In some embodiments, the angular velocity vector of the frame can be determined by the angular velocity vectors of the plurality of piezoelectric actuators. The angular velocity vectors of the piezoelectric actuators may be along three orthogonal axes. The composite of the angular velocity vectors (i.e., angular velocity of the frame) can be represented by the components in the orthogonal coordinate axes. The angular velocity of the frame can be represented by the three components in the three orthogonal directions, the frame can therefore rotate about these axes with three degrees of freedom. In some embodiments, the rotational movement of the frame can be with respect to three axes (e.g., roll, pitch and yaw axis). Alternatively, the movement of the frame may be about roll and pitch axes, or a single axis. In some embodiments, the spherical motor can be controlled to move about the roll, pitch and yaw axes. The rotational movement about each axis can be any range in any direction. The range can be a limited angle range. Alternatively, the rotational movement can be a revolving path about the spherical surface of the stator.

The spherical motor maybe controlled to rotate about one or more axes. One or more sensors may be configured to detect an angular position or angular velocity of the spherical motor. The one or more sensors may be attached to the spherical motor. The one or more sensors may comprise angular position or angular rotational sensors. The angular position or angular rotational sensors such as encoders may be used to detect a relative position of the rotor relative to the stator. The angular position or angular rotational sensors may be used to detect a relative angular position of the optical assembly relative to the housing. For example, a three-dimensional magnetic field sensor or a three-dimensional optical encoder configured to detect a rotational position of the rotor for driving the rotational movement of the optical assembly relative to the housing. The sensor may be, for example a three-dimensional Hall effect sensor 901. The sensor may be located at the stator. The sensor maybe located at the rotor. The sensor may be located at an interface between the rotor and the stator.

In some cases, the sensor for detecting a rotational position of the rotor may be located at one or more guiding rails. One or more sensors may be located at each guiding rail for detecting the movement associated with each rotational axis. The one or more sensors may include, for example, magnetic field sensors or optical encoders.

In other cases, two or more location or motion sensors may be used for detecting a rotational position of the rotor. The two or more location or motion sensors may be located at the optical assembly/the rotor and the stator/housing. The one or more sensors may include sensors configured to detect or obtain motion and position information associated with the optical assembly and the housing. The motion and position information may include velocity, orientation, attitude, acceleration, position, and/or any other physical state experienced by the optical assembly.

The one or more sensors may include an inertial measurement member comprising one or more gyroscopes, velocity sensors, accelerometers, magnetometers. An inertial sensor may be used herein to refer to a motion sensor (e.g., a velocity sensor, an acceleration sensor such as an accelerometer), an orientation sensor (e.g., a gyroscope, inclinometer), or an IMU having one or more integrated motion sensors and/or one or more integrated orientation sensors. In an example, the imaging device may comprise an inertial sensor attached to the optical assembly and an inertial sensor attached to the housing. The two inertial sensors may collectively provide a relative position of the optical assembly relative to the housing. In another example, the second inertial sensor for measuring a position or attitude of the housing may be provided on the movable object the imaging device is attached to (e.g. UAV). Alternatively, a single inertial sensor may be provided on the optical assembly and an attitude or orientation of the optical assembly may be controlled or stabilized with respect to a fixed reference frame (e.g., ground reference frame).

In some embodiments, the spherical motor may be driven by various other techniques such as ultrasonic. The spherical motor may comprise a plurality of piezoelectric actuators for driving a rotational movement of the rotor. The piezoelectric actuators may be piezoelectric vibrator elements that can be powered by electric voltage (e.g., AC voltage). The input voltage may be at ultrasonic frequency or near ultrasonic frequency. For example, the frequency of the input voltage can be the same or above 0.1 kHz, 0.5 kHz, 1 kHz, 10 kHz, 20 kHz, 25 kHz, 30 kHz, 40 kHz, and 50 kHz. The position and angular velocity of the actuators and the spherical stator relative to each other may be controlled by the input voltage such as a phase difference or phase shift, a frequency of the voltage or a combination thereof. When an AC voltage is applied to the piezoelectric actuators, a standing wave may be generated. The piezoelectric actuator elements may expand or contract depending on the pole direction. Traveling waves may be negated by a combination of two stationary waves. The piezoelectric actuators may transmit energy to the spherical stator through contact with the stator. Various characteristics of the input signal such as amplitude, phase shift, and frequency can be used to control the actuators.

The position, generated torque and/or angular velocity of the ultrasonic motor can be controlled by the phase difference and/or the driving frequency of the input voltage and other factors such as the amplitude. For instance, the position control or torque control of the ultrasonic motor can be controlled by a variable phase and fixed frequency, fixed phase and variable frequency, and variable phase and frequency.

The imaging device may be carried by a movable object, a living subject, or a stationary object. The movable object comprises an aerial vehicle, a land-based vehicle, or a handheld mount.

For example, the imaging device may allow a human being to carry the imaging device. The imaging device may comprise any shape or structure for a human being to grasp or hold. The imaging device may permit a human being to carrier or hold the camera from a variety of locations relative to optical assembly such as above, below, or behind the imaging device. The human being who is holding the handheld support may or may not be in motion.

In some embodiments, the imaging device may comprise a base support configured to allow the stabilizing unit be carried by a movable object. For example, the imaging device may be permitted to be carried by a motorized or non-motorized vehicle such as a bicycle. The vehicle may be in a motion with a large range of movement, vibration, and/or rapid movement. In some cases, the imaging device may not comprise coupling means to attach the housing of the imaging device to the movable object. In some cases, the imaging device may comprise coupling means without requirement of tools for attaching the imaging device to the movable object. When the imaging device is carried by the movable object via the base support, there may or may not be relative movement between the housing of the imaging device and the movable object.

In some embodiments, the base support may comprise a mounting assembly. The mounting assembly may enable the imaging device to be coupled to a vehicle having a complimentary portion for accepting the mounting assembly. In some cases, coupling via the mounting assembly may not require use of tools. In some cases, once coupled, the mounting assembly may be fixed relative to the coupled movable object. In other cases, the mounting assembly may be allowed to move such as rotate about a yaw axis relative to the coupled movable object.

In some embodiments, the housing of the imaging device may be coupled to a movable object via at least a motor. The imaging device as a whole may be controlled to move relative to the movable object. The imaging device described herein can be mounted to a wide variety of objects. The object can be static, such as a camera tripod. The object can be a movable object. As previously mentioned, any description herein of an aerial vehicle may apply to and be used for any movable object. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be mounted on a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human.

In some embodiments, a movable object may be small relative to a load carried by the movable object. The load may include a payload and/or a carrier, as described in further detail below. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 10:
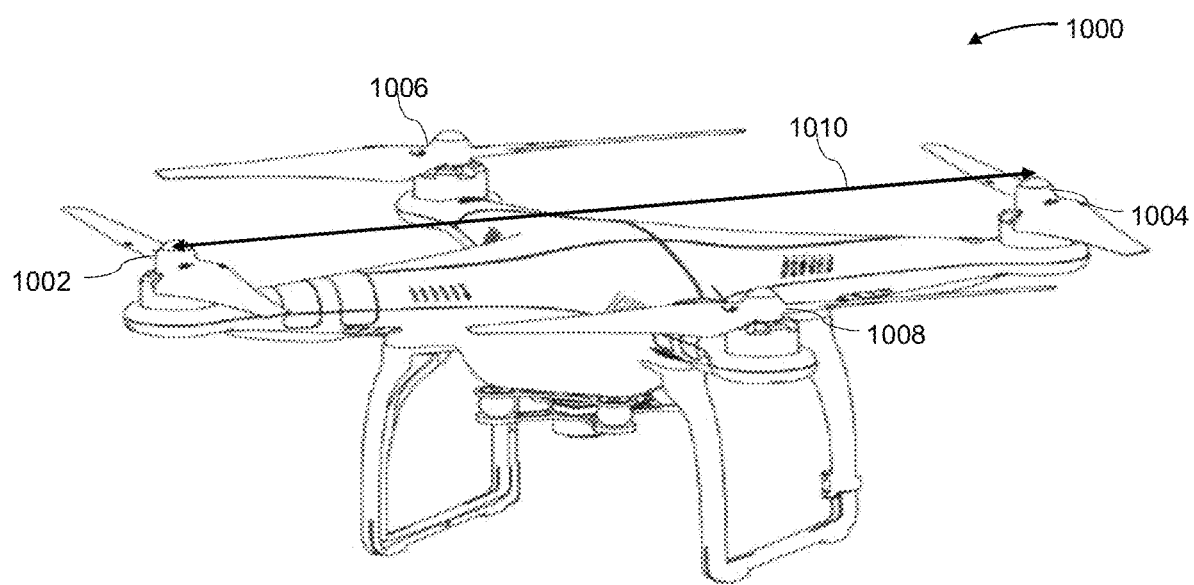
FIG. 10 illustrates an unmanned aerial vehicle (UAV), in accordance with embodiments of the present disclosure.

FIG. 10 illustrates an unmanned aerial vehicle (UAV) 1000, in accordance with embodiments of the present disclosure. The UAV may be an example of a movable object as described herein. The UAV 1000 can include a propulsion system having four rotors 1002, 1004, 1006, and 1008. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1010. For example, the length 1010 can be less than or equal to 2 m, or less than equal to 5 m. In some embodiments, the length 1010 can be within a range from 40 cm to 1 m, from 10 cm to 2 m, or from 5 cm to 5 m. Any description herein of a UAV may apply to a movable object, such as a movable object of a different type, and vice versa.

The imaging device as described herein may be carried by the UAV as a payload. The imaging device may or may not be coupled to the UAV via a carrier. The imaging device may be provided on any portion of the UAV such as external to the UAV body, inside the UAV body, and/or attached to a carrier coupled to the UAV. The imaging device may be carried by the UAV as a vision sensor. For instance, the imaging device may be used to provide location or positional information of the UAV by the captured image data.

One or more controllers may be used for controlling an attitude or stabilizing a movement of the optical assembly of the imaging device. In some cases, the controller of the imaging device may be in communication with one or more processors of the UAV. For instance, a desired orientation or stabilization mode can be input by a user via the one or more processors of the UAV. In some embodiments, a controller for controlling the carrier of the imaging device may be located inside a housing of the imaging device. In some embodiments, a controller for controlling the carrier and the actuator for rotating the housing may be located inside a housing of the imaging device. In some embodiments, a controller for controlling the carrier may be located inside a housing of the imaging device while the controller for controlling the actuator for rotating the housing is located at the UAV. In some embodiments, a controller for controlling the attitude of the optical assembly is located at the UAV.

In some embodiments, the movement of the movable object, carrier, and payload are relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 11:
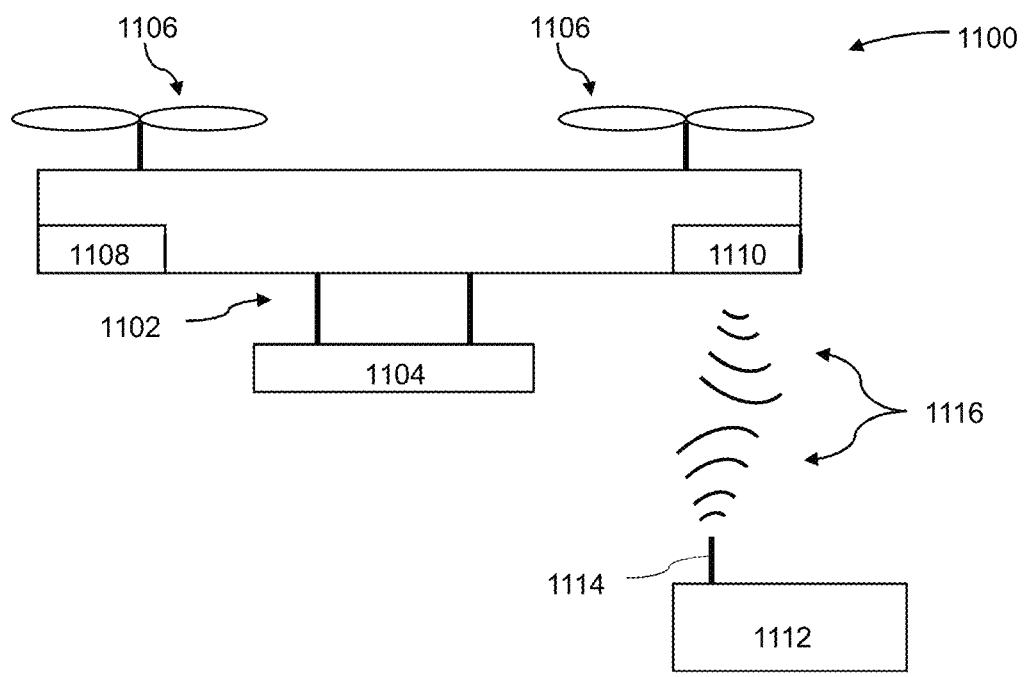
FIG. 11 illustrates a movable object including a carrier and a payload, in accordance with embodiments of the disclosure.

FIG. 11 illustrates a movable object 1100 including a carrier 1102 and a payload 1104, in accordance with embodiments. Although the movable object 1100 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1104 may be provided on the movable object 1100 without requiring the carrier 1102. The movable object 1100 may include propulsion mechanisms 1106, a sensing system 1108, and a communication system 1110. The imaging device as described herein may be included in the payload. In this case, the imaging device may be coupled to the UAV via a carrier (e.g., gimbal). Alternatively, the imaging device may be provided on the UAV without using of an external carrier.

The propulsion mechanisms 1106 can include one or more of rotors, propellers, blades, engines, motors, wheels, axles, magnets, or nozzles, as previously described. For example, the propulsion mechanisms 1106 may be self-tightening rotors, rotor assemblies, or other rotary propulsion units, as disclosed elsewhere herein. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1106 can be mounted on the movable object 1100 using any suitable means, such as a support element (e.g., a drive shaft) as described elsewhere herein. The propulsion mechanisms 1106 can be mounted on any suitable portion of the movable object 1100, such on the top, bottom, front, back, sides, or suitable combinations thereof.

In some embodiments, the propulsion mechanisms 1106 can enable the movable object 1100 to take off vertically from a surface or land vertically on a surface without requiring any horizontal movement of the movable object 1100 (e.g., without traveling down a runway). Optionally, the propulsion mechanisms 1106 can be operable to permit the movable object 1100 to hover in the air at a specified position and/or orientation. One or more of the propulsion mechanisms 1106 may be controlled independently of the other propulsion mechanisms. Alternatively, the propulsion mechanisms 1106 can be configured to be controlled simultaneously. For example, the movable object 1100 can have multiple horizontally oriented rotors that can provide lift and/or thrust to the movable object. The multiple horizontally oriented rotors can be actuated to provide vertical takeoff, vertical landing, and hovering capabilities to the movable object 1100. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1100 (e.g., with respect to up to three degrees of translation and up to three degrees of rotation).

The sensing system 1008 can include one or more sensors that may sense the spatial disposition, velocity, and/or acceleration of the movable object 1100 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1108 can be used to control the spatial disposition, velocity, and/or orientation of the movable object 1100 (e.g., using a suitable processing unit and/or control module, as described below). Alternatively, the sensing system 1108 can be used to provide data regarding the environment surrounding the movable object, such as weather conditions, proximity to potential obstacles, location of geographical features, location of manmade structures, and the like.

The communication system 1110 enables communication with terminal 1112 having a communication system 1114 via wireless signals 1116. The communication systems 1110, 1114 may include any number of transmitters, receivers, and/or transceivers suitable for wireless communication. The communication may be one-way communication, such that data can be transmitted in only one direction. For example, one-way communication may involve only the movable object 1100 transmitting data to the terminal 1112, or vice-versa. The data may be transmitted from one or more transmitters of the communication system 1110 to one or more receivers of the communication system 1114, or vice-versa. Alternatively, the communication may be two-way communication, such that data can be transmitted in both directions between the movable object 1100 and the terminal 1112. The two-way communication can involve transmitting data from one or more transmitters of the communication system 1110 to one or more receivers of the communication system 1114, and vice-versa.

In some embodiments, the terminal 1112 can provide control data to one or more of the movable object 1100, carrier 1102, and payload 1104 and receive information from one or more of the movable object 1100, carrier 1102, and payload 1104 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1106), or a movement of the payload with respect to the movable object (e.g., via control of the carrier 1102). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1108 or of the payload 1104). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1112 can be configured to control a state of one or more of the movable object 1100, carrier 1102, or payload 1104. Alternatively or in combination, the carrier 1102 and payload 1104 can also each include a communication module configured to communicate with terminal 1112, such that the terminal can communicate with and control each of the movable object 1100, carrier 1102, and payload 1104 independently.

In some embodiments, the movable object 1100 can be configured to communicate with another remote device in addition to the terminal 1112, or instead of the terminal 1112. The terminal 1112 may also be configured to communicate with another remote device as well as the movable object 1100. For example, the movable object 1100 and/or terminal 1112 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1100, receive data from the movable object 1100, transmit data to the terminal 1112, and/or receive data from the terminal 1112. Optionally, the remote device can be connected to the Internet or other telecommunications network, such that data received from the movable object 1100 and/or terminal 1112 can be uploaded to a website or server.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. Numerous different combinations of embodiments described herein are possible, and such combinations are considered part of the present disclosure. In addition, all features discussed in connection with any one embodiment herein can be readily adapted for use in other embodiments herein. It is intended that the following claims define the scope of the invention and that methods and structures within the scope of these claims and their equivalents be covered thereby.

What is claimed is:

1. An imaging device comprising:
   a housing;
   a carrier arranged within the housing, wherein the carrier comprises one or more frame components that are configured to rotate relative to the housing about one or more axes of rotation;
   an optical assembly supported by the carrier within the housing, wherein the optical assembly comprises one or more lenses and an image sensor, and wherein the optical assembly is movable relative to the housing via the carrier about the one or more axes of rotation; and
   a plurality of non-optical components arranged within the housing, wherein:
   one or more of the plurality of non-optical components are attached to an inner surface of the housing or mounted on a printed circuit board (PCB); and
   the plurality of non-optical components comprises a battery attached to the inner surface of the housing and configured to supply power to the optical assembly and the one or more of the plurality of non-optical components.

2. The imaging device of claim 1, wherein the one or more lenses are supported by a lens barrel.

3. The imaging device of claim 2, wherein the one or more lenses are partially enclosed in the lens barrel.

4. The imaging device of claim 2, wherein the one or more lenses are fully enclosed within the lens barrel.

5. The imaging device of claim 2, wherein the lens barrel is operably coupled to at least one frame component of the carrier.

6. The imaging device of claim 1, wherein the image sensor is provided on the PCB supported by a substrate holder.

7. The imaging device of claim 6, wherein a lens barrel supporting the one or more lenses is operably coupled to the substrate holder, such that the one or more lenses in the lens barrel and the PCB are movable relative to each other.

8. The imaging device of claim 7, wherein the lens barrel is movable along an optical axis of the optical assembly to adjust a distance between the one or more lenses and the image sensor.

9. The imaging device of claim 7, wherein the PCB is movable along an optical axis of the optical assembly to adjust a distance between the image sensor and the one or more lenses.

10. The imaging device of claim 7, wherein the PCB and the lens barrel are movable along an optical axis of the optical assembly to adjust a distance between the image sensor and the one or more lenses.

11. The imaging device of claim 7, wherein at least one of the lens barrel or the substrate holder is rigidly attached to at least one of the one or more frame components of the carrier.

12. The imaging device of claim 7, wherein at least one of the lens barrel or the substrate holder is movably attached to at least one of the one or more frame components of the carrier.

13. The imaging device of claim 6, wherein the substrate holder is integrally formed with a lens barrel supporting the one or more lenses.

14. The imaging device of claim 6, wherein the substrate holder is operably coupled to at least one frame component of the carrier.

15. The imaging device of claim 1, wherein the optical assembly is rotatable about one or more axes of rotation relative to a number of the plurality of the non-optical components within the camera housing.

16. The imaging device of claim 1, wherein each frame component of the one or more frame components is actuated to rotate around an axis of rotation by a motor that is operably coupled to the frame component.

17. The imaging device of claim 1, wherein at least one portion of the housing is transparent to allow a line of sight from the optical assembly to an environment external to the housing during rotation of the optical assembly.

18. The imaging device of claim 17, wherein the at least one portion of the housing comprises a removable transparent cover.

19. The imaging device of claim 1, wherein a rotational movement of the carrier is measured using one or more sensors.

20. The imaging device of claim 19, further comprising at least one inertial sensor attached to the carrier or the optical assembly.

* * * * *